(12) United States Patent
Yamaguchi et al.

(10) Patent No.: US 8,197,150 B2
(45) Date of Patent: Jun. 12, 2012

(54) FOCAL PLANE SHUTTER FOR DIGITAL CAMERAS

(75) Inventors: Yasutaka Yamaguchi, Chiba (JP); Hiroshi Miyazaki, Saitama (JP); Shigemi Takahashi, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 40 days.

(21) Appl. No.: 12/955,258

(22) Filed: Nov. 29, 2010

(65) Prior Publication Data
US 2011/0129212 A1   Jun. 2, 2011

(30) Foreign Application Priority Data

Nov. 30, 2009   (JP) ................................ 2009-272220

(51) Int. Cl.
*G03B 9/08*   (2006.01)

(52) U.S. Cl. ....................... 396/453; 396/456

(58) Field of Classification Search .................. 396/449, 396/450, 452–454, 456, 463, 471, 479–480, 396/489, 505; 348/362, 363
See application file for complete search history.

(56) References Cited

U.S. PATENT DOCUMENTS

2007/0253707 A1* 11/2007 Yoshida et al. ............... 396/489

FOREIGN PATENT DOCUMENTS

JP   2001-222059   8/2001

* cited by examiner

*Primary Examiner* — W. B. Perkey
*Assistant Examiner* — Minh Phan
(74) *Attorney, Agent, or Firm* — Wenderoth, Lind & Ponack, L.L.P.

(57) ABSTRACT

A first driving member for front blade that connects a front blade and a second driving member for front blade are rotatably mounted to a shaft 1g, a rear blade driving member that connects a rear blade is rotatably mounted to a shaft, the first driving member follows the second driving member and is rotated by a biasing force of a set spring in a setting operation, and is pressed by the second driving member and rotated in photography. The restraining means has a restraining member that can go in and out of an operation path of the restrained portion of the first driving member. When the present invention is adopted in a single-lens reflex camera, the restraining member can be within the operation path of the restrained portion in the setting operation for photography using an optical finder, and the restraining member can be outside the operation path of the restrained portion in the setting operation for photography using an electronic finder.

7 Claims, 18 Drawing Sheets

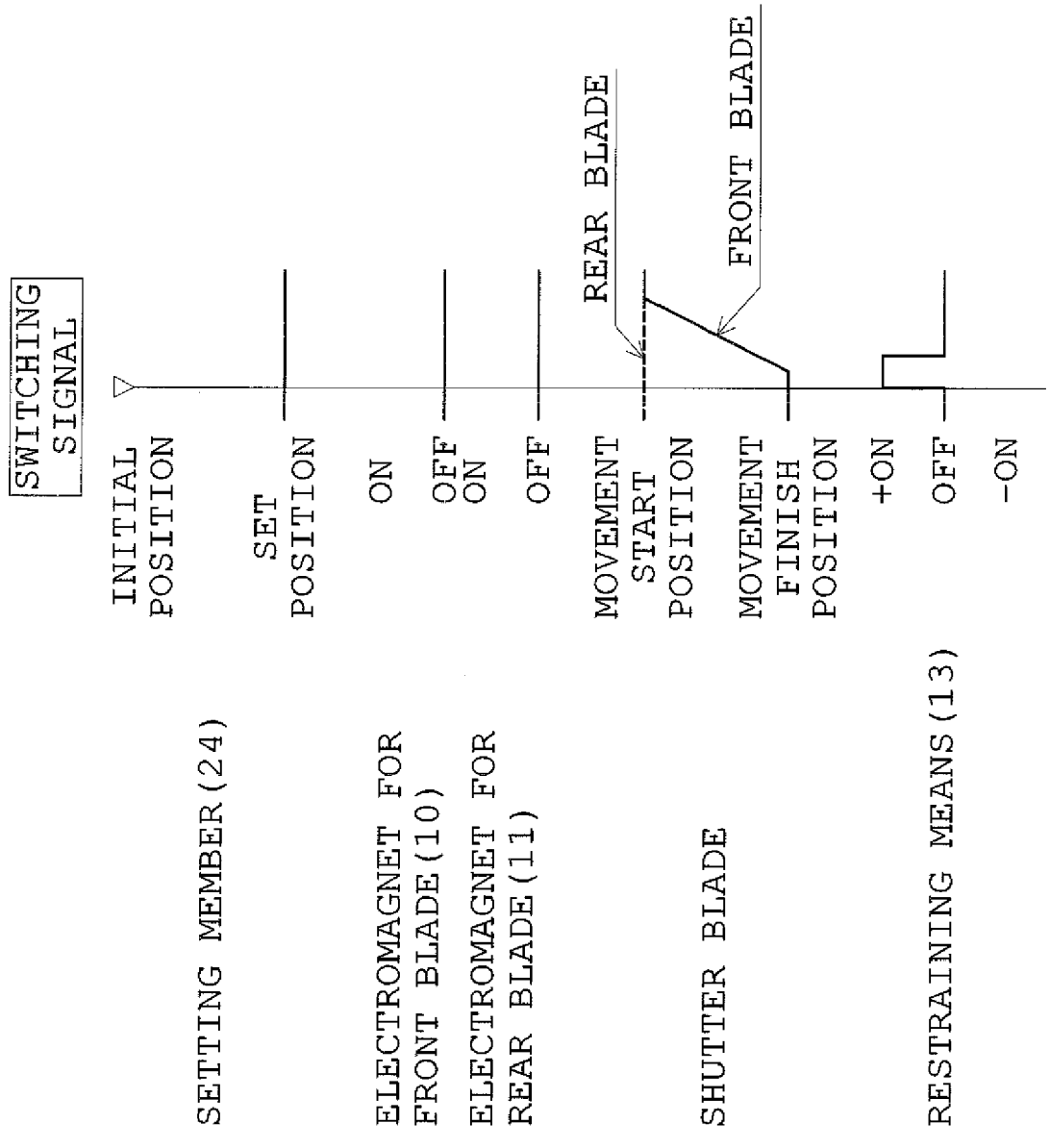

FOCAL PLANE SHUTTER FOR DIGITAL CAMERAS

BACKGROUND OF THE INVENTION

1. Field of the Invention

The present invention relates to a focal plane shutter for digital cameras.

2. Description of the Related Art

Two types of focal plane shutter for digital cameras are known. One includes two shutter blades: a front blade and a rear blade, and the other includes one shutter blade. The former is configured so that the front blade covers an exposure aperture in a set state, and in photography, the front blade and the rear blade are successively moved in the same direction, the front blade starts to open the exposure aperture to start exposure for photography (hereinafter referred to as photography exposure) of an image pickup device such as a CCD, and the rear blade finishes closing the exposure aperture to finish the photography exposure. Then, when imaging information is stored in a storage device from the image pickup device via an information processing circuit, a series of photography operations as a camera after release is finished.

For the latter, two photography methods are known. In either method, an exposure aperture is fully opened in a set state. In one method, an electronic control circuit controls an image pickup device to start photography exposure, and a shutter blade finishes closing the exposure aperture to finish the photography exposure. In the other method, an electronic control circuit controls an image pickup device to both start and finish photography exposure, and then a shutter blade closes an exposure aperture. In either case, after the shutter blade finishes closing the exposure aperture, imaging information is transmitted from the image pickup device via an information processing circuit to a storage device, and then a series of photography operations as a camera is finished.

The present invention belongs to a focal plane shutter for digital cameras of the former type. In the focal plane shutter of this type, a front blade and a rear blade are connected to a front blade driving member and a rear blade driving member. In photography, the driving members are rotated and moved by biasing forces of a front blade driving spring and a rear blade driving spring, and in setting, the driving members are reversely rotated to a set position against the biasing forces of the driving springs by a setting member rotated from an initial position. A configuration for maintaining the driving members in the set position until next photography conventionally includes a locking type configuration and a direct type configuration.

Specifically, the locking type configuration is such that each driving member is locked by each locking member in a set position. Thus, a setting member may be immediately returned to an initial position after each driving member is locked to each locking member by a setting operation. Alternatively, the setting member may be returned to the initial position after release of a camera and before a front blade driving member starts to be rotated by a biasing force of a front blade driving spring. In photography, when each locking member is operated by each electromagnet to unlock each driving member, a front blade and a rear blade are moved.

On the other hand, the direct type configuration is such that each driving member includes an iron scrap member, a setting member stops the iron scrap member in contact with each electromagnet by a setting operation, and maintains the state until next photography. Thus, the setting member is returned to an initial position when the iron scrap member is sucked by each electromagnet in the next photography. Then, when each electromagnet is deenergized to release each iron scrap member, each driving member is rotated and a front blade and a rear blade are moved.

Digital cameras include, as means for observing a subject image before photography, an optical finder, an electronic finder using a display device such as a liquid crystal panel, or both of the finders. Recent digital cameras need to have at least an electronic finder. In order to observe a subject image before photography using the electronic finder, an image pickup device for photography is advantageously concurrently used as an image pickup device for observing the subject image before photography. In this regard, for the focal plane shutter including only one shutter blade, an exposure aperture is always fully opened in a set state. Thus, the concurrent use of the image pickup device causes no problem in the configuration of the shutter.

However, for the focal plane shutter including two shutter blades, it is necessary that an exposure aperture is fully opened in a set state, and when a release button is pressed in photography, a front blade is first operated to cover the exposure aperture in an initial stage, and then the front blade and a rear blade are successively moved in the same direction. This provides an intricate configuration of the shutter. Japanese Patent Laid-Open No. 2001-222059 describes a focal plane shutter of a direct type. When this focal plane shutter is adopted in a camera including an optical finder and an electronic finder, a photographer can select a case of photography using an optical finder and a case of photography using an electronic finder before photography. In either case, a front blade starts to open an exposure aperture to start photography exposure, and a rear blade finishes closing the exposure aperture to finish the photography exposure.

As described above, the focal plane shutter described in Japanese Patent Laid-Open No. 2001-222059 includes two shutter blades, but can perform photography using an optical finder and also perform photography using an image pickup device for photography while observing a subject image to be photographed through an electronic finder. Specifically, for the camera described in Japanese Patent Laid-Open No. 2001-222059, when the photographer selects photography using the electronic finder, a movable mirror (quick return mirror) is maintained in an up state, and the exposure aperture is fully opened. When a release button of the camera is pressed in photography, the front blade first closes the exposure aperture, then the front blade starts to open the exposure aperture to start the photography exposure, and after a predetermined time, the rear blade finishes closing the exposure aperture to finish the photography exposure.

However, recent high-grade cameras have become increasingly multifunctional. There is such a demand that even with a focal plane shutter configured so that two shutter blades can be operated to perform photography, like a focal plane shutter including one shutter blade, a photographer can select before photography to perform photography in which an exposure aperture is fully opened in a set state, when a release button of a camera is pressed in photography, an electronic control circuit controls an image pickup device to start photography exposure with the exposure aperture being fully opened, and a shutter blade finishes closing the exposure aperture to finish the photography exposure, or photography in which an electronic control circuit controls an image pickup device to both start and finish photography exposure, and then a rear blade closes an exposure aperture.

The present invention is achieved in view of such problems, and has an object to provide a direct-type compact focal plane shutter for digital cameras that can perform photography in a mode in which a front blade closes an exposure aperture and a rear blade is retracted from the exposure aperture in a set state, and in photography, the front blade starts to open the exposure aperture to start photography exposure and the rear blade finishes closing the exposure aperture to finish the photography exposure for photography using an optical finder, and can perform photography in a mode in which both the front blade and the rear blade open the exposure aperture in the set state, and in photography, the front blade once closes the exposure aperture in an initial stage after release, and then the front blade starts to open the exposure aperture to start photography exposure and the rear blade finishes closing the exposure aperture to finish the photography exposure for photography using an electronic finder, and can also perform photography in a mode in which in photography, the front blade is not operated, but an electronic control circuit controls an image pickup device to only start the photography exposure or both start and finish the photography exposure and thus only the rear blade is operated to close the exposure aperture.

SUMMARY OF THE INVENTION

In order to achieve the above object, the present invention provides a focal plane shutter for digital cameras including: a first driving member for front blade that connects a front blade, has a pressed portion and a restrained portion, and is rotatably mounted to a first shaft of a shutter base plate; a second driving member for front blade that has a pressing portion, is rotatably mounted to the first shaft, is rotated by biasing a front blade driving spring in photography, and causes a front blade to open an exposure aperture when the pressing portion presses the pressed portion in rotation of the second driving member and rotates the first driving member for front blade together; a set spring that directly or indirectly biases the first driving member for front blade so as to be rotated to a position where the front blade covers the exposure aperture in a set state; a rear blade driving member that connects a rear blade, is rotatably mounted to a second shaft of the shutter base plate, and is rotated by a biasing force of a rear blade driving spring in photography, and causes the rear blade to close the exposure aperture; a setting member that is rotatably mounted to a third shaft of the shutter base plate, is rotated from an initial position to rotate the second driving member for front blade and the rear blade driving member against the biasing force of each driving spring in an setting operation, maintains the driving members in the set state in a set position, and returns the driving members to the initial position after release of a camera and before start of photography exposure; and restraining means that has a restraining member that can go in and out of an operation path of the restrained portion, is mounted to the shutter base plate, can operate the restraining member in the operation path of the restrained portion immediately after finish of photography and before start of the setting operation of the setting member when the restraining member is outside the operation path of the restrained portion, and can operate the restraining member out of the operation path of the restrained portion in a restraining state of the restrained portion when the restraining member is within the operation path of the restrained portion.

In such a focal plane shutter for digital cameras of the present invention, the restraining means may be an electromagnetic device, and the restraining member may be a reciprocatable movable element of the electromagnetic device. The restraining means may include an electromagnetic actuator, and a member reciprocated by the electromagnetic actuator, and the member may be the restraining member.

However, it is most practical that the restraining means is an electromagnetic device, and the restraining member is a member integrated with the movable element. In this case, the movable element is preferably a rotor. In particular, it is preferable that the rotor is a permanent magnet rotor that is reciprocatingly rotated within a predetermined angle range in a direction corresponding to an energization direction to a stator coil of the electromagnetic device, and the restraining member is formed to extend in a radial direction of the permanent magnet rotor, and has a tip that is a restraining portion for the restrained portion. Further in this case, a magnetic member is mounted to a stator of the electromagnetic device, and when the stator coil is deenergized, the permanent magnet rotor is maintained in a stop state by a magnetic force applied between the permanent magnet rotor and the magnetic member in either of opposite end positions of the rotation angle range. This is advantageous in terms of power consumption.

Although the focal plane shutter for digital cameras of the present invention has a compact configuration including the front blade and the rear blade, the focal plane shutter can perform photography in a mode in which the front blade closes the exposure aperture and the rear blade is retracted from the exposure aperture in the set state, and in photography, the front blade starts to open the exposure aperture to start the photography exposure and the rear blade finishes closing the exposure aperture to finish the photography exposure for photography using an optical finder, can perform photography in a mode in which both the front blade and the rear blade open the exposure aperture in the set state, and in photography, the front blade once closes the exposure aperture in an initial stage after release, and then the front blade starts to open the exposure aperture to start photography exposure and the rear blade finishes closing the exposure aperture to finish the photography exposure for photography using an electronic finder, and can also perform photography in a mode in which in photography, the front blade is not operated, but an electronic control circuit controls an image pickup device to only start the photography exposure or both start and finish the photography exposure and thus only the rear blade is operated to close the exposure aperture. Thus, the focal plane shutter can perform photography by selecting at least two of the photography modes and is extremely advantageously used in a camera.

These and other features and advantages of the present invention will become apparent from the following detailed description of the preferred embodiment when taken in conjunction with the accompanying drawings.

BRIEF DESCRIPTION OF THE DRAWINGS

FIG. 18 is a timing chart showing an operational relationship of the main components of the shutter in switching from the second photography mode or the third photography mode to the first photography mode.

DETAILED DESCRIPTION OF THE PREFERRED EMBODIMENT

Now, an embodiment of the present invention will be described with reference to the drawings.

As described above, a focal plane shutter for digital cameras of the present invention can perform photography in a mode (hereinafter referred to as a first mode) in which a front blade closes an exposure aperture and a rear blade is retracted from the exposure aperture in a set state, and in photography, the front blade starts to open the exposure aperture to start photography exposure and the rear blade finishes closing the exposure aperture to finish the photography exposure for photography using an optical finder, and can perform photography in a mode (hereinafter referred to as a second mode) in which both the front blade and the rear blade open the exposure aperture in the set state, and in photography, the front blade once closes the exposure aperture in an initial stage after release, and then the front blade starts to open the exposure aperture to start photography exposure and the rear blade finishes closing the exposure aperture to finish the photography exposure for photography using an electronic finder.

Further, the focal plane shutter for digital cameras can perform photography in a mode (hereinafter referred to as a third mode) in which both the front blade and the rear blade open the exposure aperture in the set state, and in photography, the front blade is not operated, but an electronic control circuit controls an image pickup device to start the photography exposure and the rear blade closes the exposure aperture to finish the photography exposure for photography using the electronic finder, or can perform photography in a mode (hereinafter referred to as a fourth mode) in which the electronic control circuit controls the image pickup device to both start and finish the photography exposure and the rear blade is operated to close the exposure aperture after finish of the photography exposure.

Thus, when a camera includes the focal plane shutter for digital cameras of the present invention, the camera can perform photography in any two or more photography modes among the above four photography modes, and a photographer can select a desired photography mode among the modes and perform photography. However, descriptions on all the cases will be redundant because of many overlapping descriptions. Also, all the cases can be understood without such descriptions. Thus, the embodiment will be described for a camera that can select one desired mode among the first to third photography modes for performing photography, and the fourth photography mode will be additionally described. Even for the case of photography using the optical finder, an operation by a sequence in the first photography mode and also an operation by a sequence in the second photography mode or the third photography mode may be performed. This will be stated in the description on operation in the embodiment.

Embodiment

Figure 1:
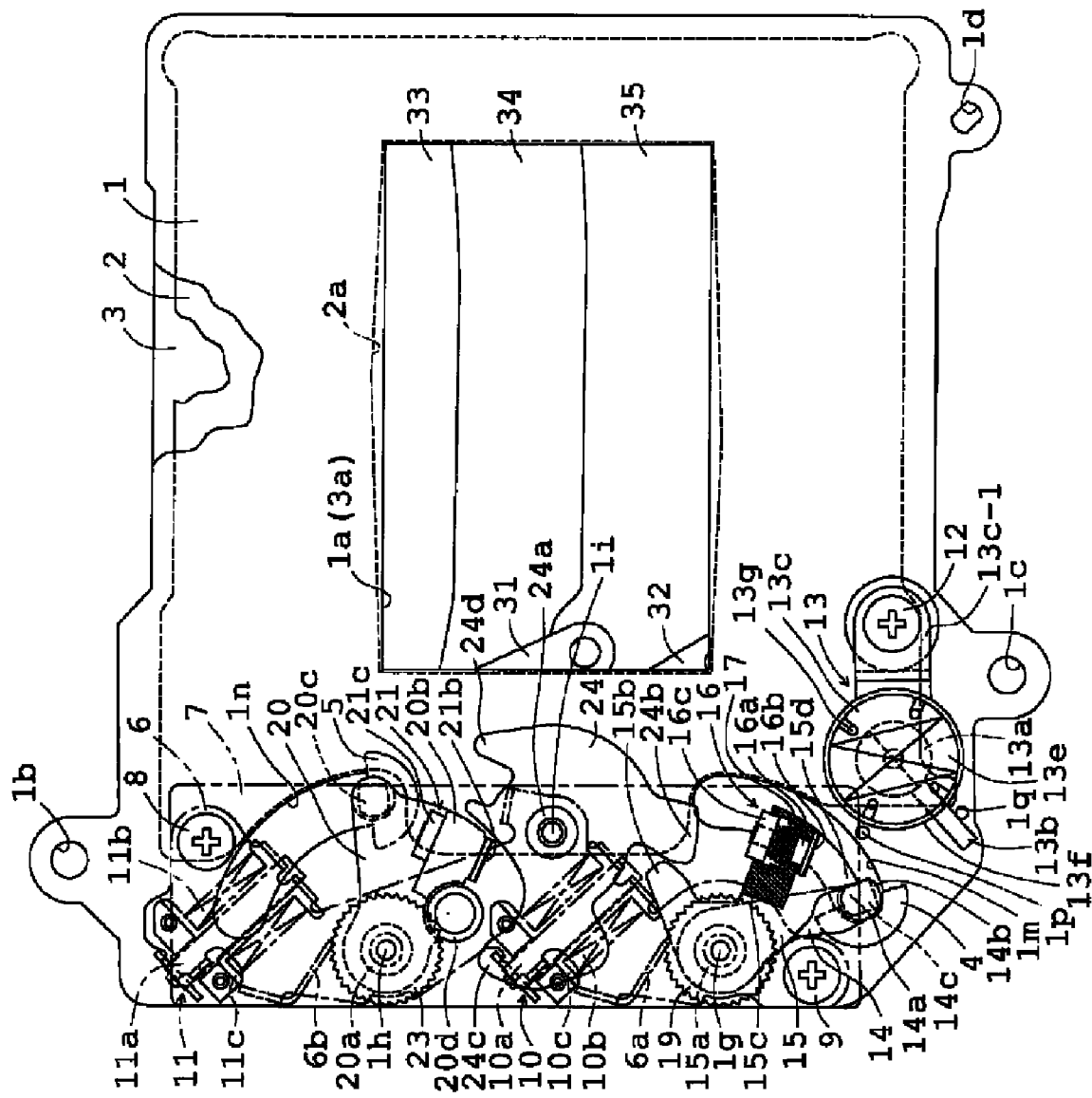
FIG. 1 is a general plan view showing an embodiment of a focal plane shutter according to the present invention.
Figure 2:
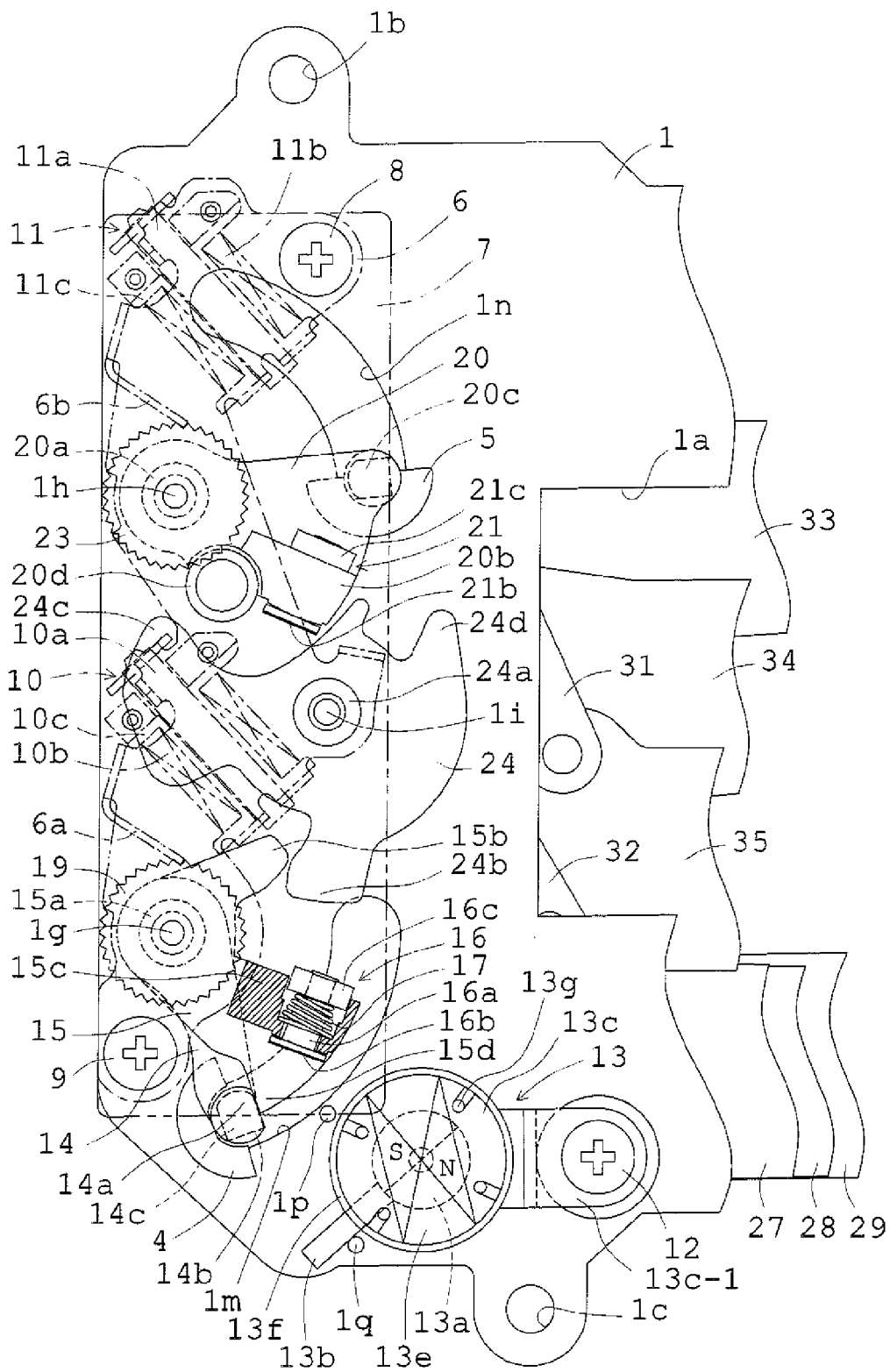
FIG. 2 is an enlarged plan view showing substantially the left half in FIG. 1.
Figure 3:
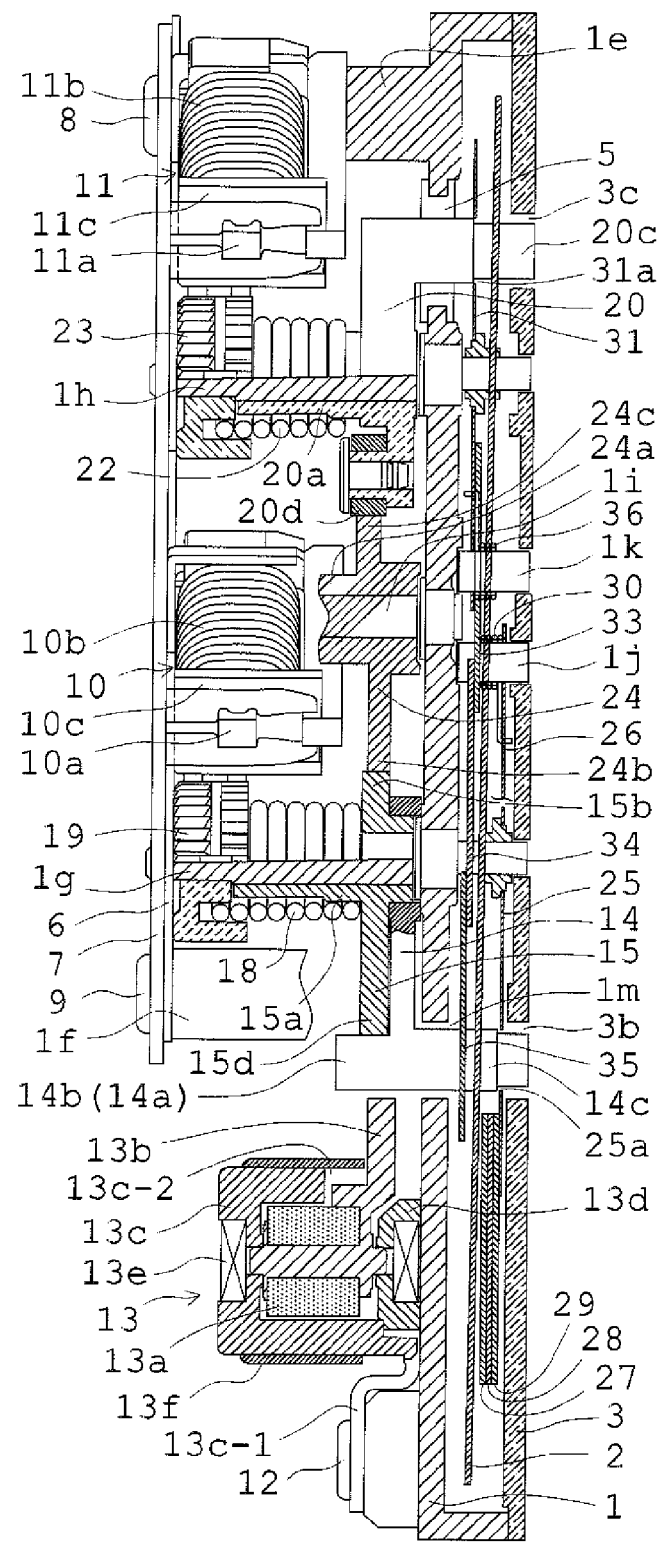
FIG. 3 is a side view, with a part of members shown in section, viewed from the right in FIG. 2.
Figure 4:
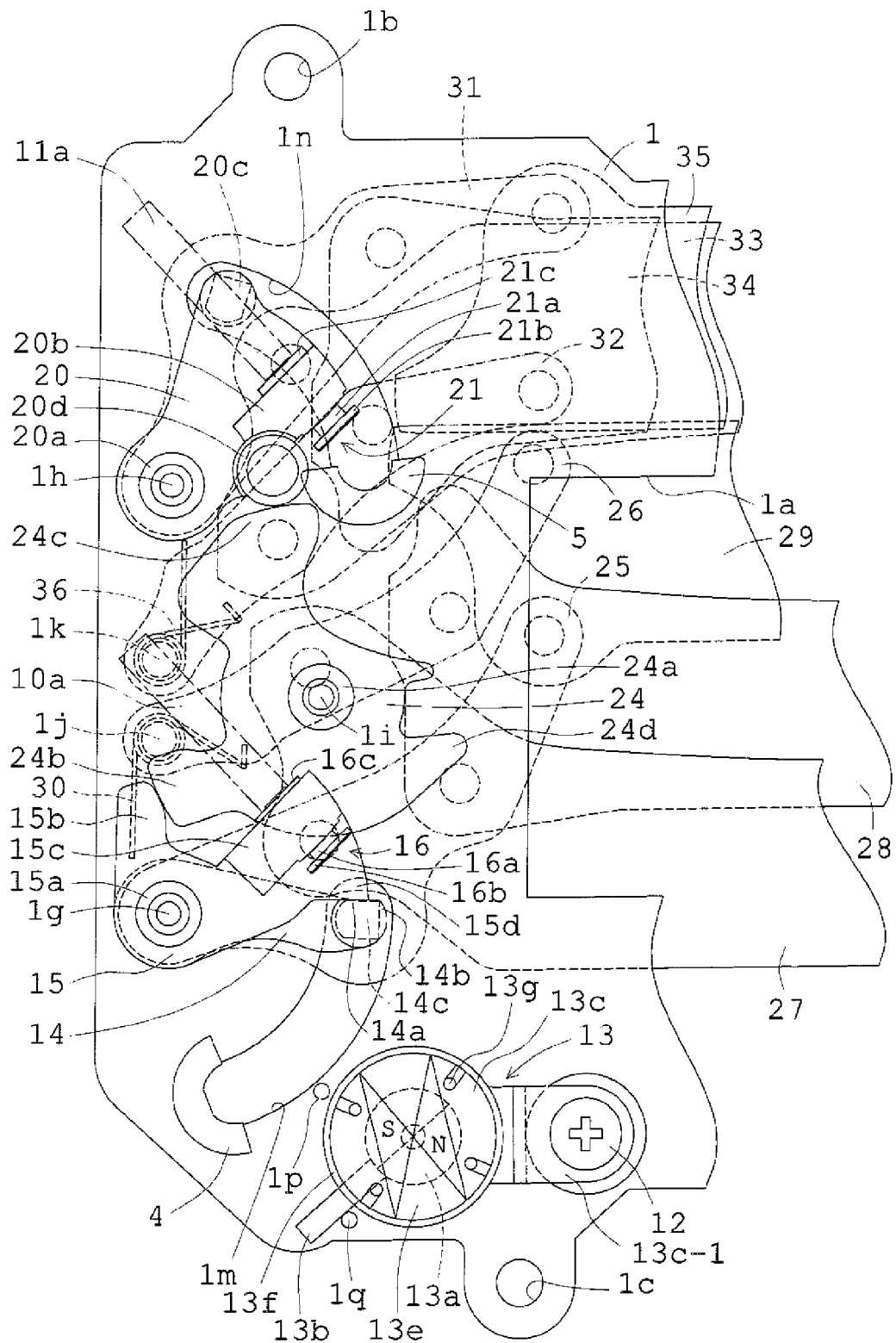
FIG. 4 is a plan view showing a set state of the shutter when a first photography mode is selected.

First, a configuration of this embodiment will be described mainly with reference to FIGS. 1 to 4. FIG. 1 is a general plan view showing a state after finish of photography and before start of a setting operation, FIG. 2 is an enlarged plan view showing substantially the left half in FIG. 1, FIG. 3 is a side view, with a part of members shown in section, viewed from the right in FIG. 2. FIG. 4 is a plan view showing a set state of a component when a first photography mode is selected. Hereinafter, descriptions will be made on the premise that when a focal plane shutter of this embodiment is incorporated into a camera, a front side in FIG. 1 is a subject side, that is, a photography lens side, and a back side in FIG. 1 is an image pickup device side. However, as well known, for a digital camera, the front side in FIG. 1 may be an image pickup device side, and the back side in FIG. 1 may be a subject side.

A shutter base plate 1 is made of synthetic resin, and has, substantially in the center thereof, an aperture 1a for exposure having a horizontally oriented rectangular shape. In FIG. 1, an upper region of the aperture 1a is shown partially broken away so that a part of an intermediate plate 2 and an auxiliary base plate 3 described later can be visually checked. The shutter base plate 1 has three holes 1b, 1c and 1d in an upper left, a lower left, and a lower right in FIG. 1. Among the holes, the holes 1b and 1c are used for mounting to a camera body with screws, and a hole 1c is fitted on a positioning pin provided in the camera body.

As well known, on the image pickup device side of the shutter base plate 1, the intermediate plate 2 and the auxiliary base plate 3 are mounted in the order at a predetermined distance therebetween, a blade chamber of a rear blade described later is formed between the shutter base plate 1 and the intermediate plate 2, and a blade chamber of a front blade described later is formed between the intermediate plate 2 and the auxiliary base plate 3. The intermediate plate 2 has a plurality of unshown holes fitted on a plurality of unshown shafts standing on the shutter base plate 1, while the auxiliary base plate 3 is made of synthetic resin and mounted to the shutter base plate 1 with unshown appropriate means such as a screw. The intermediate plate 2 and the auxiliary base plate 3 are shown in only FIGS. 1 and 3, and not shown in other drawings.

As shown in FIG. 1, a contour of the intermediate plate 2 is one size smaller than a contour of the shutter base plate 1, but a contour of the auxiliary base plate 3 is substantially the same as the contour of the shutter base plate 1. The intermediate plate 2 and the auxiliary base plate 3 also have apertures 2a and 3a in positions overlapping the aperture 1a. In FIG. 1, the aperture 3a has substantially the same shape as the aperture 1a, but actually has a rectangular shape slightly larger than the aperture 1a. The aperture 2a is larger than the aperture 1a and has angled edges corresponding to long sides of the aperture 1a. Thus, in this embodiment, the aperture 1a formed in the shutter base plate 1 determines a shape of an exposure aperture, that is, an image frame shape as the shutter.

On a surface of the shutter base plate 1 on the subject side, two columns 1e and 1f are formed in an upper position and a lower position of a left region of the aperture 1a, and three shafts 1g, 1h and 1i stand in a region therebetween. Among them, the columns 1e and 1f are shown only in FIG. 3, and top surfaces thereof have screw holes. As is apparent from the shafts 1g and 1h shown in FIG. 3, the shafts 1g, 1h and 1i have small diameter portions at tips on the subject side. Further, as shown in FIG. 3, the other ends of the shafts 1g and 1h protrude from a surface of the shutter base plate 1 on the image pickup device side, and tops thereof are inserted into holes formed in the auxiliary base plate 3. Also as shown in FIGS. 3 and 4, two shafts 1j and 1k stand on the surface of the shutter base plate 1 on the image pickup device side.

As shown in FIGS. 1, 2 and 4, the shutter base plate 1 has two arcuate slots 1m and 1n around the shafts 1g and 1h. At lower ends of the slots 1m and 1n, well-known shock absorbing members 4 and 5 are mounted made of rubber and having a C-shaped plane. Slots 3b and 3c having the same shape are formed in the auxiliary base plate 3 to face the slots 1m and 1n, and are shown in section only in FIG. 3. Further, the shutter base plate 1 also has an arcuate slot around the shaft 1i, but this slot is not shown.

A support plate 6 and a printed-wiring board 7 shown in FIG. 3 are stacked with the support plate 6 on the side of the shutter base plate 1, and screwed to the top surfaces of the column 1e and 1f by two screws 8 and 9. The tips of the small diameter portions formed in the shafts 1g, 1h and 1i are inserted into holes formed in the support plate 6 and the printed-wiring board 7. For the clarity of other components, in FIGS. 1 and 2, a contour of the support plate 6 is shown by a dash-single-dot line, and a contour of the printed-wiring board 7 is shown by a dash-double-dot line. The support plate 6, the printed-wiring board 7, and the two screws 8 and 9 are not shown in the drawings other than FIGS. 1 to 3.

The support plate 6 is formed of a thin metal plate, and has a plurality of bent portions bent toward the shutter base plate 1. An electromagnet for front blade 10 and an electromagnet for rear blade 11 are mounted to the plurality of bent portions in a well-known manner, but in FIGS. 1 and 2, the two electromagnets 10 and 11 are also shown by dash-single-dot lines like the support plate 6. The electromagnet for front blade 10 and the electromagnet for rear blade 11 have completely the same configuration, and include U-shaped iron core members 10a and 11a having two legs, and bobbins 10c and 11c having hollow portions and around which coils 10b and 11b are wound. The iron core members 10a and 11a have two legs whose tips are magnetic pole portions, the legs are arranged and mounted perpendicular to the support plate 6, and one of the legs passes through the hollow portion of the bobbins 10c and 11c.

Two terminal pins stand on each of the bobbins 10c and 11c so that opposite ends of the coils 10b and 11b are wound therearound, and tips of the terminal pins pass through unshown holes provided in the support plate 6 and the printed-wiring board 7. The opposite ends of each of the coils 10b and 11b are soldered to a wiring pattern formed on the printed-wiring board 7 on the subject side of the printed-wiring board 7. The coils 10b and 11b and the bobbins 10c and 11c are shown only in FIGS. 1 to 3, and only the iron core members 10a and 11a are shown in the other drawings. As well known, two armature members that are also turned on/off by a first driving member for front blade 14 described later are mounted to the printed-wiring board 7, but not shown.

On the surface of the shutter base plate 1 on the subject side, restraining means 13 is mounted by a screw 12. The restraining means 13 in this embodiment is an electromagnetic device having a deformed configuration of a well-known current control actuator described in Japanese Patent Laid-Open No. 2005-173132 or the like. Specifically, in the electromagnetic actuator described in Japanese Patent Laid-Open No. 2005-173132, an output pin for reciprocatingly rotating a shutter blade is formed integrally with a permanent magnet rotor so as to be parallel to a rotating shaft of the permanent magnet rotor. On the other hand, in the restraining means 13 in this embodiment, a rod-like restraining member 13b made of synthetic resin and having a square top surface is formed integrally with a permanent magnet rotor 13a perpendicularly to a rotating shaft of the permanent magnet rotor 13a in order to prevent counterclockwise rotation of the first driving member for front blade 14 described later in FIG. 1.

Thus, the current control actuator drives a shutter blade or a diaphragm blade with the output pin and is thus the very actuator. However, the restraining means 13 in this embodiment is an electromagnetic device having a similar configuration, but the restraining member 13b merely restrains rotation of the first driving member for front blade 14 described later and cannot be referred to as an actuator. Thus, although configurations other than the restraining member 13b are known, the configuration and operation of the restraining means 13 will be briefly described with reference to FIGS. 2 and 3.

First, the configuration will be described. A first stator frame 13c has a cylindrical shape with one closed end, and forms an accommodation chamber for the permanent magnet rotor 13a between the first stator frame 13c and a plate-like second stator frame 13d. The stator frames 13c and 13d are integrated in such a manner that a shaft of the permanent magnet rotor 13a is received in the accommodation chamber, and a coil 13e is wound around a groove formed outside the accommodation chamber so as to surround both shaft receiving portions. Then, a cylindrical yoke 13f is fitted to the first stator frame 13c.

As shown in FIG. 3, the first stator frame 13c has a window 13c-2, and the restraining member 13b protrudes outward through the window 13c-2, and can be reciprocatingly rotated only within a predetermined angle range by the permanent magnet rotor 13a. As shown in FIG. 2, four magnetic rods 13g (only one is denoted by reference numeral) are inserted from the subject side into the first stator frame 13c so as to be parallel to a rotating shaft of the permanent magnet rotor 13a. Further, the first stator frame 13c has an overhanging portion 13c-1, and the overhanging portion 13c-1 is screwed by the screw 12 and thus the restraining means 13 is mounted to the shutter base plate 1. As well known, the number of the magnetic rods 13g is not limited to four.

Next, the operation of the restraining means 13 in this embodiment will be described. As shown in FIG. 2, the permanent magnet rotor 13a is radially magnetized to two poles, and when the coil 13e is energized in a forward direction, the permanent magnet rotor 13a is rotated counterclockwise, and the restraining member 13b abuts against a stopper pin 1q and is thus stopped. When the coil 13e is then energized in a reverse direction, the permanent magnet rotor 13a is rotated clockwise, and the restraining member 13b abuts against the stopper pin 1p and is thus stopped.

Even if the coil 13e is deenergized when the restraining member 13b is in contact with the stopper pin 1p, a magnetic force of the permanent magnet rotor 13a applied between the permanent magnet rotor 13a and the four magnetic rods 13g applies a clockwise rotating force to the permanent magnet rotor 13a, and a stop state with the restraining member 13b in contact with the stopper pin 1p is maintained. Also, even if the coil 13e is deenergized when the restraining member 13b is in contact with the stopper pin 1q, a counterclockwise rotating force is applied to the permanent magnet rotor 13a for the same reason as described above, and a stop state with the restraining member 13b in contact with the stopper pin 1q is maintained.

Figure 8:
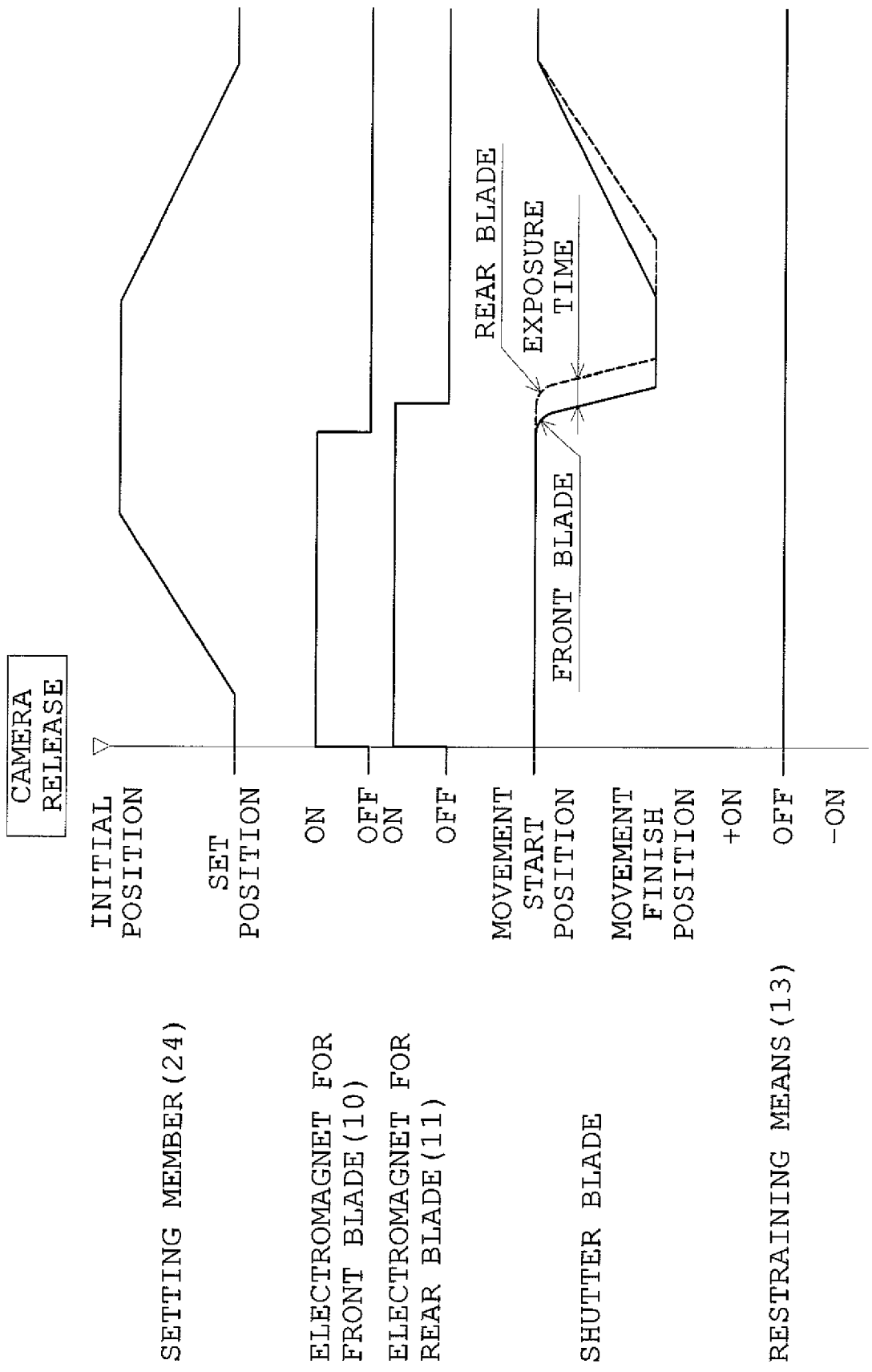
FIG. 8 is a timing chart showing an operational relationship of main components of the shutter in photography in the first photography mode.

In a timing chart in FIG. 8, "+ON" in "restraining means (13)" refers to a state where a control signal to rotate the permanent magnet rotor 13a counterclockwise is given, and a current is supplied to the coil 13e in the forward direction as described above, and "−ON" refers to a state where a control signal to rotate the permanent magnet rotor 13a clockwise is given, and a current is supplied to the coil 13e in the reverse direction. "OFF" refers to a state where neither of the signals is given, and the coil 13e is not energized. This applies to the other timing charts.

On the subject side of the shutter base plate 1, the first driving member for front blade 14 and the second driving member for front blade 15 are rotatably mounted to the shaft 1g with the first driving member for front blade 14 on the side of the shutter base plate 1. A specific mounting configuration thereof is, as shown in FIG. 3, such that the second driving member for front blade 15 has a cylindrical portion 15a directly fitted to the shaft 1g, and the first driving member for front blade 14 has a hole fitted on an outside of the cylindrical portion 15a of the second driving member for front blade 15.

First, the first driving member for front blade 14 will be described. The first driving member for front blade 14 includes a pressed portion 14a, a restrained portion 14b, and a driving pin 14c. Among them, both the pressed portion 14a and the restrained portion 14b are formed adjacent to each other in an area formed to be thick on the subject side with the pressed portion 14a on the side of the shaft 1g. The pressed portion 14a is pressed by a pressing portion 15d of the second driving member for front blade 15 described later. The restrained portion 14b abuts against the tip of the restraining member 13b and is restrained when the first driving member for front blade 14 is to be rotated counterclockwise.

The driving pin 14c stands on the side of the shutter base plate 1, is inserted into the slot 1m in the shutter base plate 1, and has a tip inserted into the slot 3b formed in the auxiliary base plate 3. A root and a tip of the driving pin 14c have different sectional shapes, and the root has a D-shaped section, and the tip has a shell-like section. The root abuts against the shock absorbing member 4, and the tip is connected to the front blade described later.

On the other hand, the second driving member for front blade 15 includes the cylindrical portion 15a, and also a pressed portion 15b, a mounting portion 15c formed to be thick on the subject side, and a pressing portion 15d. In FIGS. 1 and 2, as the mounting portion 15c is shown partially cut in parallel with the shutter base plate 1, the mounting portion 15c accommodates an iron scrap member 16 and a compression spring 17. The iron scrap member 16 has a disk-like head 16b at one end of a shaft portion 16a, and has an iron scrap portion 16c mounted to the other end of the shaft portion 16a, and the compression spring 17 fitted to the shaft portion 16a biases the iron scrap portion 16c so as to protrude out of the mounting portion 15c. In FIG. 3, the mounting portion 15c is not shown for making the drawing more visible.

As shown in FIG. 3, a front blade driving spring 18 is loosely fitted to the cylindrical portion 15a of the second driving member for front blade 15. A ratchet member 19 is rotatably mounted to the small diameter portion of the shaft 1g of the shutter base plate 1. Further, as shown in FIGS. 1 and 2, one of the bent portions of the support plate 6 is a ratchet pawl 6a, and a tip of the ratchet pawl 6a is meshed with ratchet teeth formed on an outer peripheral portion of the ratchet member 19 to prevent counterclockwise rotation of the ratchet member 19.

The front blade driving spring 18 has, as well known, one end placed on an unshown spring placing portion of the second driving member for front blade 15, and the other end placed on an unshown spring placing portion of the ratchet member 19, and biases the second driving member for front blade 15 so as to be rotated clockwise in FIG. 1. The biasing force can be adjusted by temporarily removing the ratchet pawl 6a and changing a rotation position of the ratchet member 19. The front blade driving spring 18 is shown in only FIG. 3, and the ratchet member 19 is shown in only FIGS. 1 to 3.

A rear blade driving member 20 is rotatably mounted to the shaft 1h standing on the shutter base plate 1. The rear blade driving member 20 includes a cylindrical portion 20a, a mounting portion 20b, and a driving pin 20c, and further, as shown in FIG. 3, a roller 20d is rotatably mounted by press-fitting a removal preventing member to fit the cylindrical portion 20a to the shaft 1h. The mounting portion 20b has completely the same configuration as the mounting portion 15c of the second driving member for front blade 15, and accommodates an iron scrap member 21 and a compression spring. Since the mounting portion 20b is not shown in section as the mounting portion 15c, a head 21b and an iron scrap portion 21c of the iron scrap member 21 can be visually checked but a shaft portion 21a cannot be visually checked in FIGS. 1 and 2. The compression spring cannot be visually checked in any operational states described later. In FIG. 3, the mounting portion 20b is not shown.

The driving pin 20c stands on the side of the shutter base plate 1 like the driving pin 14d of the first driving member for front blade 14, is inserted into the slot 1n in the shutter base plate 1, and has a tip inserted into the slot 3c formed in the auxiliary base plate 3. A root and a tip of the driving pin 20c also have different sectional shapes, and the root has a circular section, and the tip has a shell-like section. The root abuts against the shock absorbing member 5, and the tip is connected to the rear blade described later.

As shown in FIG. 3, a rear blade driving spring 22 is loosely fitted to the cylindrical portion 20a of the rear blade driving member 20. A ratchet member 23 is rotatably mounted to the small diameter portion of the shaft 1h of the shutter base plate 1. Further, as shown in FIGS. 1 and 2, one of the bent portions of the support plate 6 is a ratchet pawl 6b, and a tip of the ratchet pawl 6b is meshed with ratchet teeth formed on an outer peripheral portion of the ratchet member 23 to prevent counterclockwise rotation of the ratchet member 23.

The rear blade driving spring 22 has, as well known, one end placed on an unshown spring placing portion of the rear blade driving member 20, and the other end placed on an unshown spring placing portion of the ratchet member 23, and biases the rear blade driving member 20 so as to be rotated clockwise in FIG. 1. The biasing force can be adjusted by temporarily removing the ratchet pawl 6b and changing a rotation position of the ratchet member 23. The rear blade driving spring 22 is shown in only FIG. 3, and the ratchet member 23 is shown in only FIGS. 1 to 3.

A setting member 24 is rotatably mounted to the shaft 1i standing on the shutter base plate 1, and biased by an unshown spring so as to be rotated counterclockwise. An unshown engagement pin stands on a surface of the setting member 24 on the side of the shutter base plate 1, and is inserted into an unshown arcuate slot formed around the shaft 1i in the shutter base plate 1. In FIGS. 1 and 2, the setting member 24 is rotated counterclockwise by a biasing force of the unshown spring, and the engagement pin abuts against one end of the unshown slot and is stopped. For the setting member 24, this position is hereinafter referred to as an initial position.

The setting member 24 has, in addition to the unshown engagement pin, a cylindrical portion 24a, two pressing portions 24b and 24c, and a pressed portion 24d, and the cylindrical portion 24a is rotatably fitted to the shaft 1i. The pressing portion 24b presses the pressed portion 15b of the second driving member for front blade 15, the pressing portion 24c presses the roller 20d of the rear blade driving member 20, and the pressed portion 24d is pressed by an unshown member of a camera body.

Next, configurations of the front blade and the rear blade placed on the back side of the shutter base plate 1 will be described mainly with reference to FIG. 4. First, the front blade placed between the intermediate plate 2 and the auxiliary base plate 3 includes, on the back side of the shutter base plate 1, an arm 25 rotatably mounted to the shaft 1g, an arm 26 rotatably mounted to the shaft 1j, and three blades 27, 28 and 29 pivoted on the arms 25 and 26 in the order toward the tips, and the blade 29 is a slit forming blade of the front blade. As well known, the tip of the driving pin 14c of the first driving member for front blade 14 is fitted in a slot 25a (shown in section in FIG. 3) formed in the arm 25. As shown in FIG. 3, in the arm 25, a hole in a member integrated by swaging is actually fitted on the shaft 1g.

Further, a set spring 30 that is a coil spring is fitted to the shaft 1j of the shutter base plate 1, has one end placed on an unshown spring placing portion provided in the shutter base plate 1 and the other end placed on the arm 26, and biases the arm 26 to be rotated counterclockwise. Thus, in this embodiment, as is apparent from the later description on operation, the set spring 30 serves to rotate the first driving member for front blade 14 counterclockwise via the front blade, and simultaneously serves as an anti-backlash spring of the front blade as well known. A biasing force of the set spring 30 is smaller than a biasing force of the front blade driving spring 18. In this embodiment, the set spring 30 is fitted to the shaft 1j, but may be fitted to the shaft 1g and bias the arm 25 to be rotated counterclockwise.

On the other hand, the rear blade is placed between the shutter base plate 1 and the intermediate plate 2, includes, on the back side of the shutter base plate 1, an arm 31 rotatably mounted to the shaft 1h, an arm 32 rotatably mounted to the shaft 1k, and three blades 33, 34 and 35 pivoted on the arms 31 and 32 in the order toward the tips, and a blade 35 is a slit forming blade of the rear blade. As well known, the tip of the driving pin 20c of the rear blade driving member 20 is fitted in a slot 31a (shown in section in FIG. 3) formed in the arm 31.

Further, a spring 36 is fitted to the shaft 1k of the shutter base plate 1 in the same manner as the set spring 30, and has one end placed on an unshown spring placing portion provided in the shutter base plate 1 and the other end placed on the arm 32, and biases the arm 32 to be rotated counterclockwise. Thus, the spring 36 biases the rear blade driving member 20 to be rotated counterclockwise via the rear blade, and a biasing force of the spring 36 is smaller than the biasing force of the rear blade driving spring 22. Unlike the set spring 30, the spring 36 simply serves as a well-known anti-backlash spring. Thus, the spring 36 may be configured so as to apply clockwise torque to the arm 32. The spring 36 may be fitted to the shaft 1h to rotate the arm 31 clockwise or counterclockwise.

Next, the operation of this embodiment will be described. As already described, the focal plane shutter for cameras of this embodiment can perform photography by operating selection means included in the camera and selecting a desired photography mode among three photography modes. Thus, for the description on operation of this embodiment, an operation in the first photography mode, an operation in the second photography mode, and an operation in the third photography mode will be described in this order, and switching operations thereof will be described as appropriate.

First, the operation in the first photography mode will be described with reference to FIGS. 4 to 7 that are plan views showing operational states of components in operational stages, and FIG. 8 that is a timing chart showing an operational relationship of main components. As described above, the first photography mode is a mode in which the front blade starts to open the exposure aperture to start photography exposure and the rear blade finishes closing the exposure aperture to finish the photography exposure for photography using an optical finder.

FIG. 4 shows a set state when a photographer operates the selection means to select the first photography mode before photography. At this time, for a single-lens reflex camera including a movable mirror, an unshown movable mirror is in a down state so that a subject image can be observed through an optical finder. In a setting operation, the pressed portion 24d of the setting member 24 is pressed by the unshown member of the camera body, and the setting member 24 is rotated clockwise from the initial position to a set position against a biasing force of an unshown spring. In this set state, the member of the camera body prevents the setting member 24 from being returned to the initial position.

At this time, the electromagnet for front blade 10 and the electromagnet for rear blade 11 are not energized, but in the setting operation by the setting member 24, the pressed portion 15b of the second driving member for front blade 15 is pressed by the pressing portion 24b of the setting member 24 against the biasing force of the front blade driving spring 18, and the second driving member for front blade 15 is rotated counterclockwise. Also, the roller 20d of the rear blade driving member 20 is pressed by the pressing portion 24c of the setting member 24 against the biasing force of the rear blade driving spring 22, and the rear blade driving member 20 is rotated counterclockwise. The iron scrap members 16 and 21 mounted to the driving members have the iron scrap portions 16c and 21c in contact with the iron core members 10a and 11a of the electromagnets 10 and 11.

The first driving member for front blade 14 is rotated counterclockwise by a biasing force of the set spring 30 along with counterclockwise rotation of the second driving member for front blade 15 in the setting operation, and the pressed portion 14a is maintained in contact with the pressing portion 15d of the second driving member for front blade 15. Further, the restraining means 13 is not energized, and the permanent magnet rotor 13a brings the restraining member 13b into contact with the stopper pin 1q outside the operation path of the restrained portion 14b of the first driving member for front blade 14, and this state is maintained in the manner described above.

Thus, in this set state, the front blade connected to the first driving member for front blade 14 develops the three blades 27 to 29 to close the aperture 1a, and the rear blade connected to the rear blade driving member 20 is stored above the aperture 1a with the three blades 33 to 35 stacked, and a subject light is not applied to an image pickup device such as a CCD.

In the set state in FIG. 4, the shaft portions 16a and 21a of the iron scrap members 16 and 21 can be visually checked. This is because, as well known, in the setting operation, the second driving member for front blade 15 and the rear blade driving member 20 are rotated and stopped while overcharging the driving springs 18 and 22 and compressing a compression spring (17 etc.) even after the iron scrap portions 16c and 21c of the iron scrap members 16 and 21 are brought into contact with the iron core members 10a and 11a by the setting member 24.

In such a state in FIG. 4, when a release button of the camera is pressed while the subject image is observed through the optical finder, the movable mirror is brought into an up state, and both the coil 10b of the electromagnet for front blade 10 and the coil 11b of the electromagnet for rear blade 11 are energized. Thus, the iron scrap members 16 and 21 having been simply in contact with the iron core members 10a and 11a of the electromagnets 10 and 11 are sucked and held by electromagnetic forces. On the other hand, when this photography mode is selected, the coil 13e of the restraining means 13 is not energized at all. Thus, the restraining member 13b of the restraining means 13 is always maintained in contact with the stopper pin 1q.

As such, when the iron scrap members 16 and 21 are sucked and held by the iron core members 10a and 11a of the two electromagnets 10 and 11, the unshown member of the camera body is retracted from the operation path of the pressed portion 24d of the setting member 24. Along therewith, the setting member 24 is rotated counterclockwise by a biasing force of an unshown spring. In this process, the pressing portion 24b of the setting member 24 is moved away from the pressed portion 15b of the second driving member for front blade 15, and the pressing portion 24c is moved away from the roller 20d of the rear blade driving member 20. Thus, the second driving member for front blade 15 starts to be rotated clockwise while operating the front blade together with the first driving member for front blade 14 by the biasing force of the front blade driving spring 18 and the biasing force of the compression spring 17, and the rear blade driving member 20 starts to be rotated clockwise while operating the rear blade by the biasing force of the rear blade driving spring 22 and the biasing force of the unshown compression spring.

Figure 5:
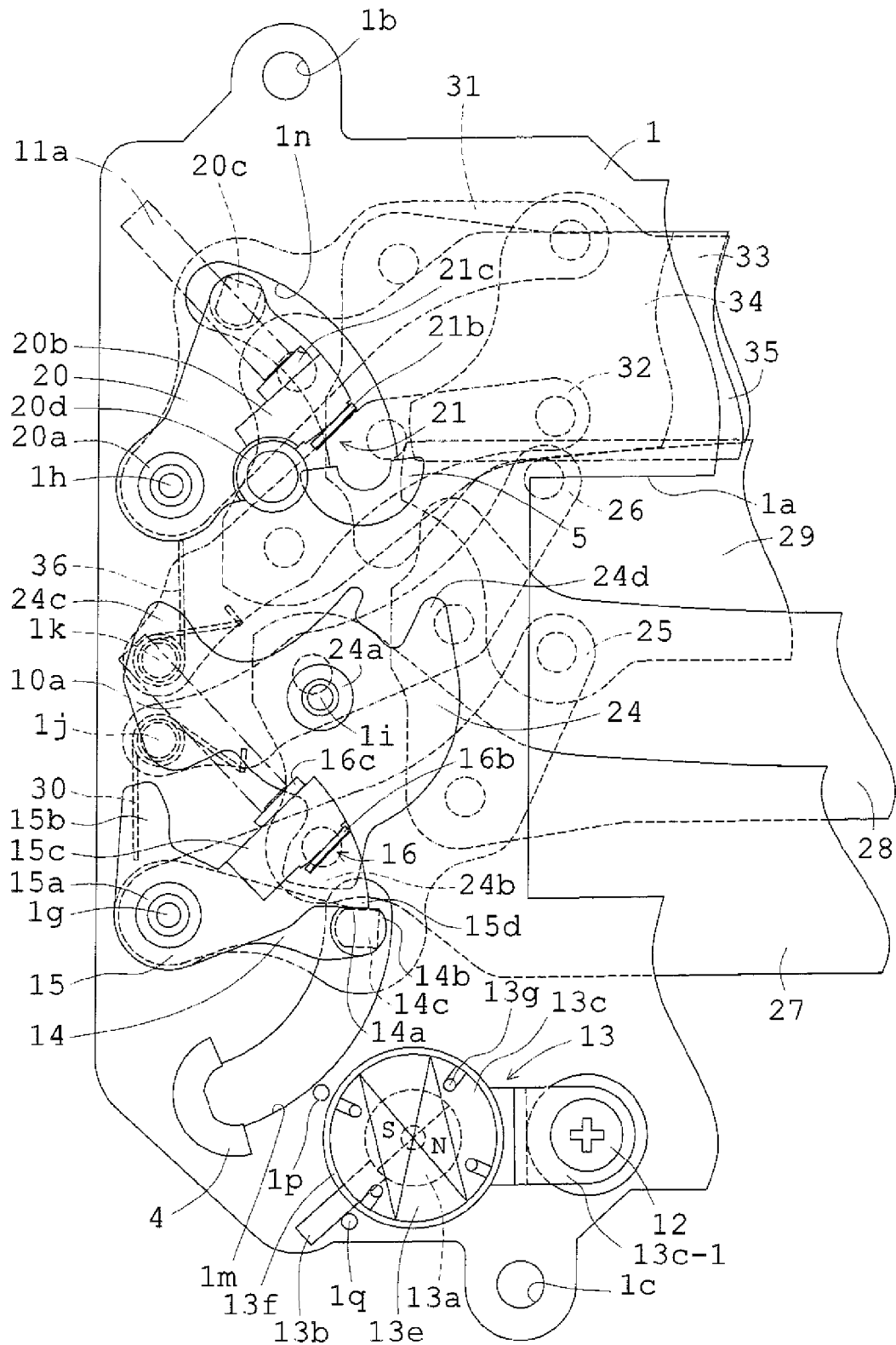
FIG. 5 is a plan view showing a state of the shutter after a release button of a camera is pressed and before photography exposure is actually started in the state in FIG. 4.

However, since the iron scrap members 16 and 21 have been already sucked by the iron core members 10a and 11a, the driving members 14, 15 and 20 are simply slightly rotated and then stopped by the mounting portions 15c and 20b abutting against the heads 16b and 21b of the iron scrap members 16 and 21. Thus, in this stage, the front blade does not open the aperture 1a, and the rear blade does not enter the aperture 1a. Then, the setting member 24 is returned to the initial position, and the unshown engaging portion abuts against one end of the unshown slot formed in the shutter base plate 1 and is stopped. This state is shown in FIG. 5. In FIG. 8, the slight operations of the front blade and the rear blade are not shown. This also applies to other timing charts.

As such, in the state in FIG. 5, the coil 10b of the electromagnet for front blade 10 is deenergized and then the coil 11b of the electromagnet for rear blade 11 is deenergized at a time interval corresponding to a photography condition such as a subject light and determined by an exposure time control circuit. First, when the coil 10b of the electromagnet for front blade 10 is deenergized, the second driving member for front blade 15 is quickly rotated clockwise by the biasing force of the front blade driving spring 18. At this time, the pressing portion 15d of the second driving member for front blade 15 presses the pressed portion 14a of the first driving member for front blade 14, and thus the first driving member for front blade 14 is also quickly rotated clockwise against the biasing force of the set spring 30. Thus, the three blades 27 to 29 of the front blade are quickly moved downward with an increasing amount of mutual overlapping of adjacent blades to open the aperture 1a from top to bottom.

Then, when the coil 11b of the electromagnet for rear blade 11 is deenergized, the rear blade driving member 20 is quickly rotated clockwise by the biasing force of the rear blade driving spring 22, the three blades 33 to 35 of the rear blade are quickly moved downward with a decreasing amount of mutual overlapping of adjacent blades to close the aperture 1a from top to bottom. Such rotation of the rear blade driving member 20 is started before the front blade fully opens the aperture 1a when the subject light is relatively bright. Thus, in this case, an imaging surface of an image pickup device is continuously exposed from top to bottom by a slit formed between the slit forming blade 29 of the front blade and the slit forming blade 35 of the rear blade.

On the other hand, when the subject light is relatively dark, in the rear blade driving member 20, the front blade fully opens the aperture 1a and then the rear blade closes the aperture 1a. Thus, as well known, in this case, an unshown pressing portion provided on the first driving member for front blade 14 brings unshown two armature members mounted to the printed-wiring board 7 into contact with each other in a movement finish stage of the front blade, and thus flush can be emitted in the fully opened state of the aperture 1a.

Figure 6:
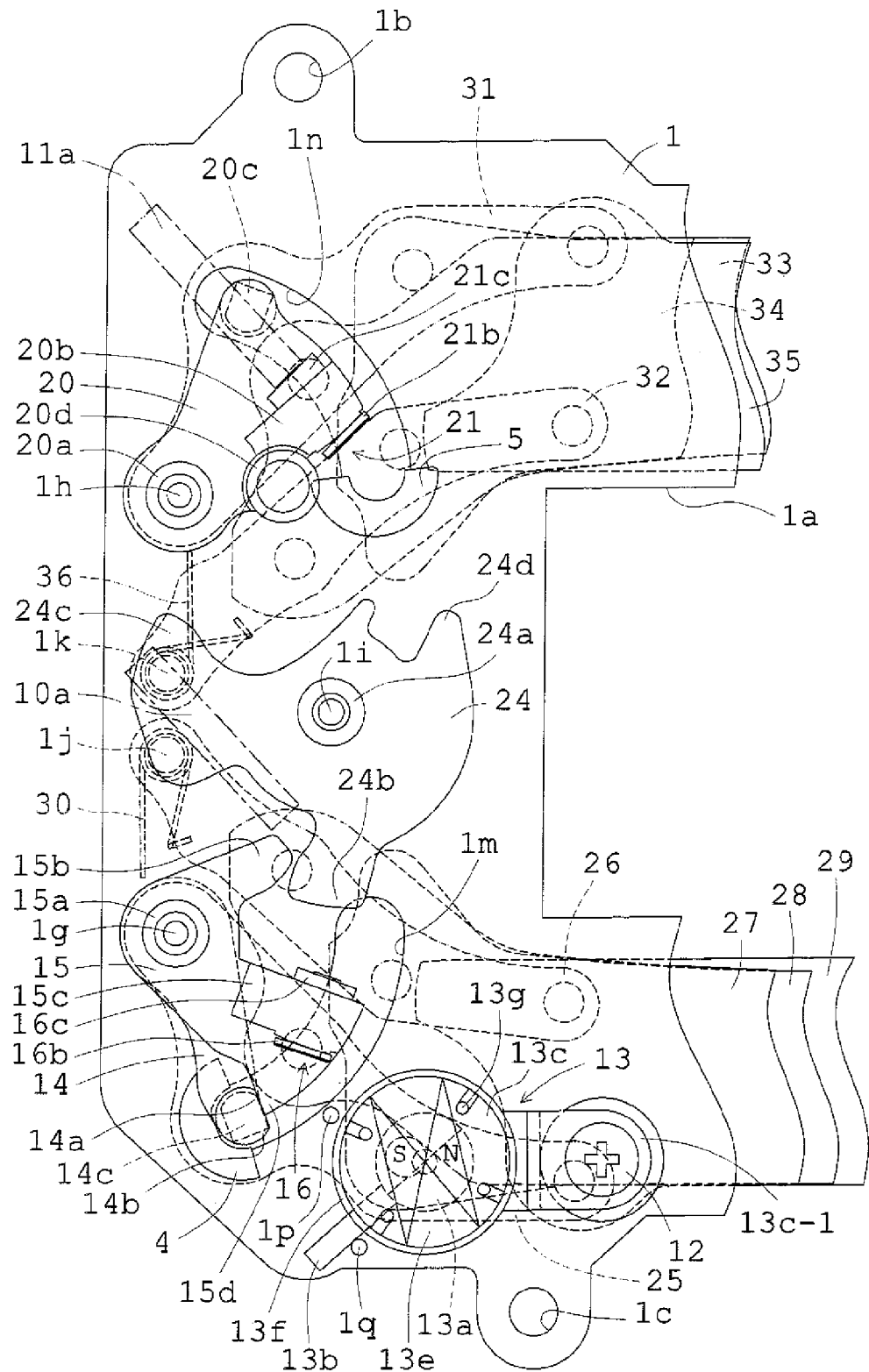
FIG. 6 is a plan view showing a state of the shutter where a front blade starts to be moved and fully opens an exposure aperture from the state in FIG. 5.
Figure 7:
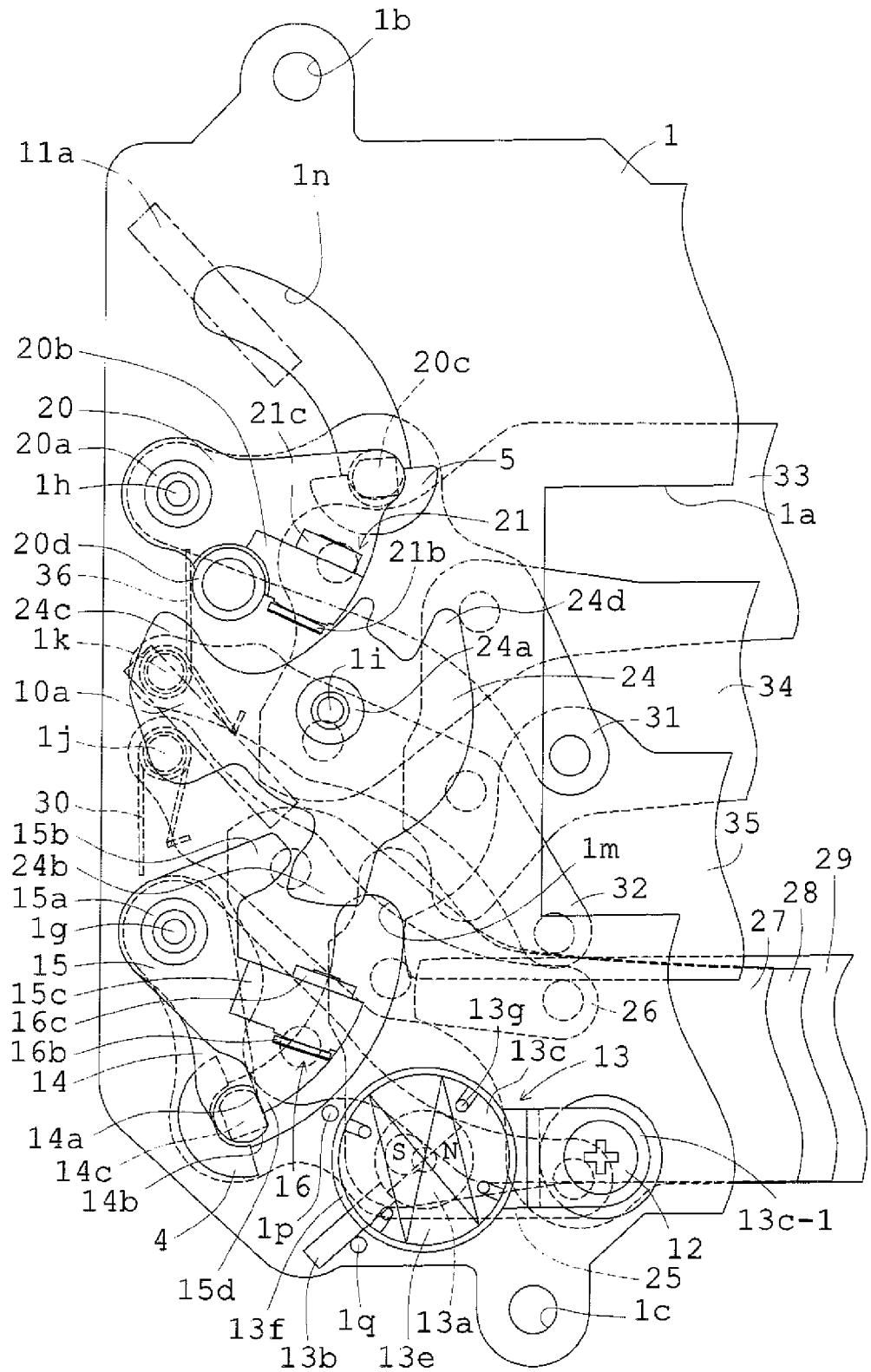
FIG. 7 is a plan view showing a state of the shutter where a rear blade starts to be moved and closes the exposure aperture from the state in FIG. 6.

FIG. 6 shows a state where the front blade fully opens the aperture 1a, then the driving pin 14c of the first driving member for front blade 14 abuts against the shock absorbing member 4 to stop rotation of the two driving members 14 and 15, and the three blades 27 to 29 of the front blade are stacked and stored below the aperture 1a in the case where the subject light is relatively dark. FIG. 7 shows a state where the three blades 27 to 29 of the front blade are stacked and stored below the aperture 1a, then the three blades 33 to 35 of the rear blade are developed to close the aperture 1a, and the rear blade driving member 20 is stopped by the driving pin 20c abutting against the shock absorbing member 5 irrespective of the brightness of the subject light.

As such, in the state in FIG. 7, photographed imaging information is transmitted from the image pickup device via an information processing circuit and stored in a storage device. When the imaging information is stored in the storage device, an unshown movable mirror is brought into a down state, and the setting operation is immediately started. The setting operation is performed in the state in FIG. 7 in such a manner that the unshown member of the camera body presses the pressed portion 24d of the setting member 24 to rotate the setting member 24 clockwise against the biasing force of the unshown spring.

When the setting member 24 starts to be rotated clockwise, first, the pressing portion 24b of the setting member 24 presses the pressed portion 15b of the second driving member for front blade 15, and starts to rotate the second driving member for front blade 15 counterclockwise against the biasing force of the front blade driving spring 18. Thus, the pressed portion 14a follows the pressing portion 15d of the second driving member for front blade 15, and the first driving member for front blade 14 also starts to be rotated counterclockwise by the biasing force of the set spring 30. Thus, the three blades 27 to 29 of the front blade are moved upward with a decreasing amount of mutual overlapping of adjacent blades.

Then, when the amount of mutual overlapping of the slit forming blade 29 of the front blade and the slit forming blade 35 of the rear blade reaches a predetermined amount, the pressing portion 24c of the setting member 24 starts to press the roller 20d of the rear blade driving member 20, and the rear blade driving member 20 also starts to be rotated counterclockwise against the biasing force of the rear blade driving spring 22. Thus, the three blades 33 to 35 of the rear blade are moved upward with an increasing amount of mutual overlapping of adjacent blades. Thereafter, the front blade and the rear blade are moved upward together with a decreasing amount of mutual overlapping of the slit forming blades 29 and 35 by a cam shape of the pressing portions 24b and 24c of the setting member 24 as is apparent from FIG. 8.

As such, when the three blades 27 to 29 of the front blade are developed to close the aperture, and the three blades 33 to 35 of the rear blade are stacked and completely retracted upward from the aperture 1a, immediately thereafter, the iron scrap portions 16c and 21c of the iron scrap members 16 and 21 mounted to the second driving member for front blade 14 and the rear blade driving member 20 successively abut against the iron core members 10a and 11a of the electromagnet for front blade 10 and the electromagnet for rear blade 11.

In this regard, it is impossible to fabricate the iron scrap portions 16c and 21c so as to simultaneously abut against the iron core members 10a and 11a in terms of mass production. Thus, in the rotation of the setting member 24, the iron scrap portions 16c and 21c are stopped together with the driving members 14, 15 and 20 after the time when the iron scrap portions 16c and 21c are supposed to abut against the iron core members 10a and 11a in design. Thus, in the process from the abutment to the stop, the second driving member for front blade 15 overcharges the front blade driving spring 18, and compresses the compression spring 17 that biases the iron scrap member 16, and the rear blade driving member 20 overcharges the rear blade driving spring 22 and compresses the unshown compression spring that biases the iron scrap member 21.

Thus, in the stop state of the second driving member for front blade 15 and the rear blade driving member 20, the iron scrap portions 16c and 21c of the iron scrap members 16 and 21 are pressed into the mounting portions 15c and 20b, a part of the shaft portions 16a and 21a are pressed out of the mounting portions 15c and 20b, and the heads 16b and 21b are moved away from the mounting portions 15c and 20b. This state is the set state shown in FIG. 4, and as long as the photography in the first photography mode is selected, this state is maintained until the release button of the camera is pressed in the next photography.

Next, a switching operation when the second photography mode or the third photography mode is selected in the state where the first photography mode is selected by the selection means of the camera, that is, in the set state shown in FIG. 4 will be described. For the descriptions thereof, the contents that can be sufficiently understood from the description on operation in the first photography mode will be simplified.

In this embodiment, it is natural that an operation sequence of the shutter for each photography differs between when the photography mode is switched to the second photography mode and when the photography mode is switched to the third photography mode as described later, but set states of the components are completely the same. Thus, for the components of the shutter, the switching operation from the first photography mode to the second photography mode and the switching operation from the first photography mode to the third photography mode are performed in completely the same manner. In this case, a switching operation can be performed by selecting and adopting a switching method optimum for general design specifications of the camera among several switching methods. Thus, three switching methods that can be adopted in switching from the first photography mode to the second photography mode or the third photography mode will be described in the order.

Figure 9:
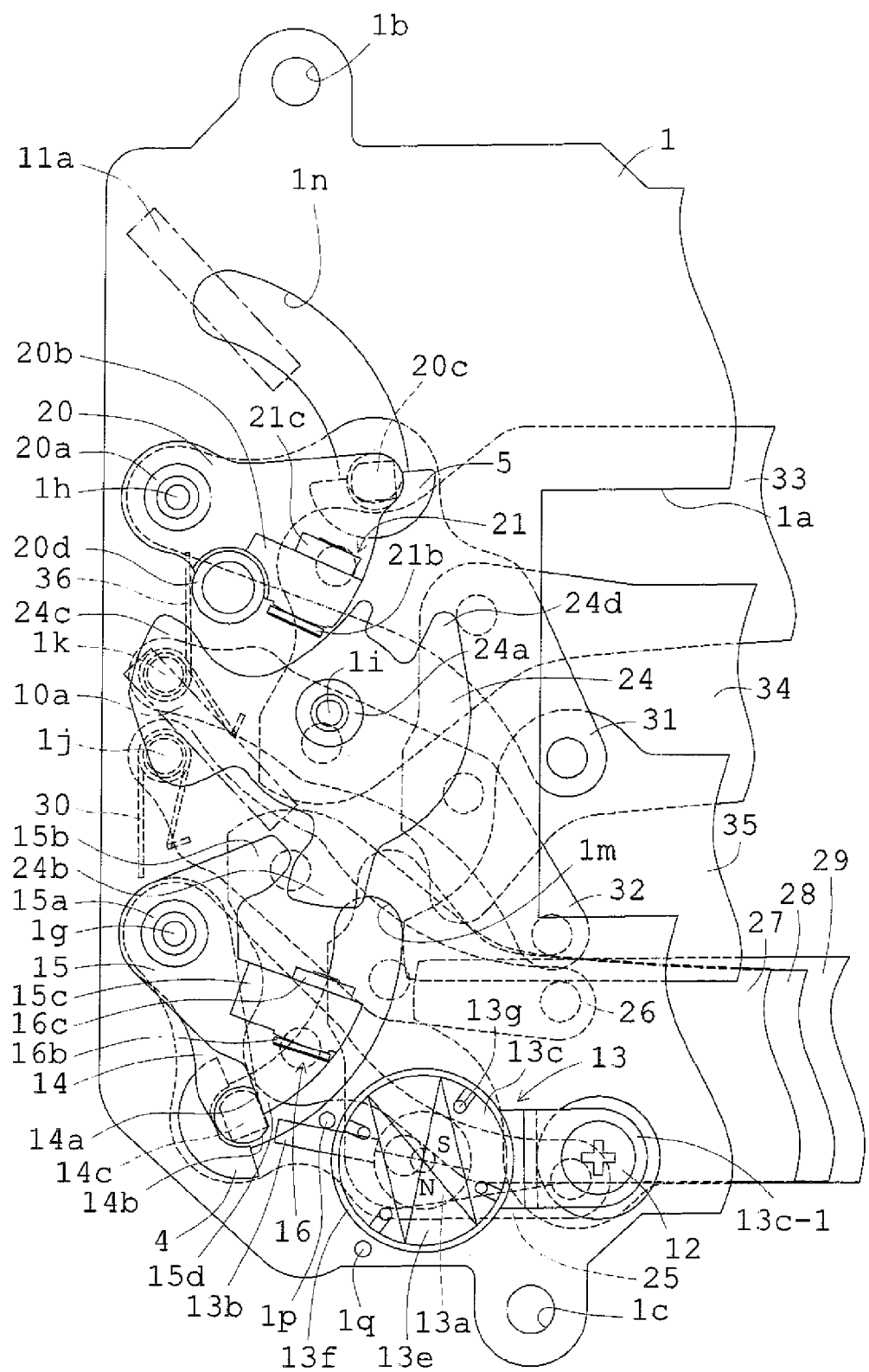
FIG. 9 is a plan view showing a state of the shutter in switching when a second photography mode or a third photography mode is selected in a selection state of the first photography mode.
Figure 10:
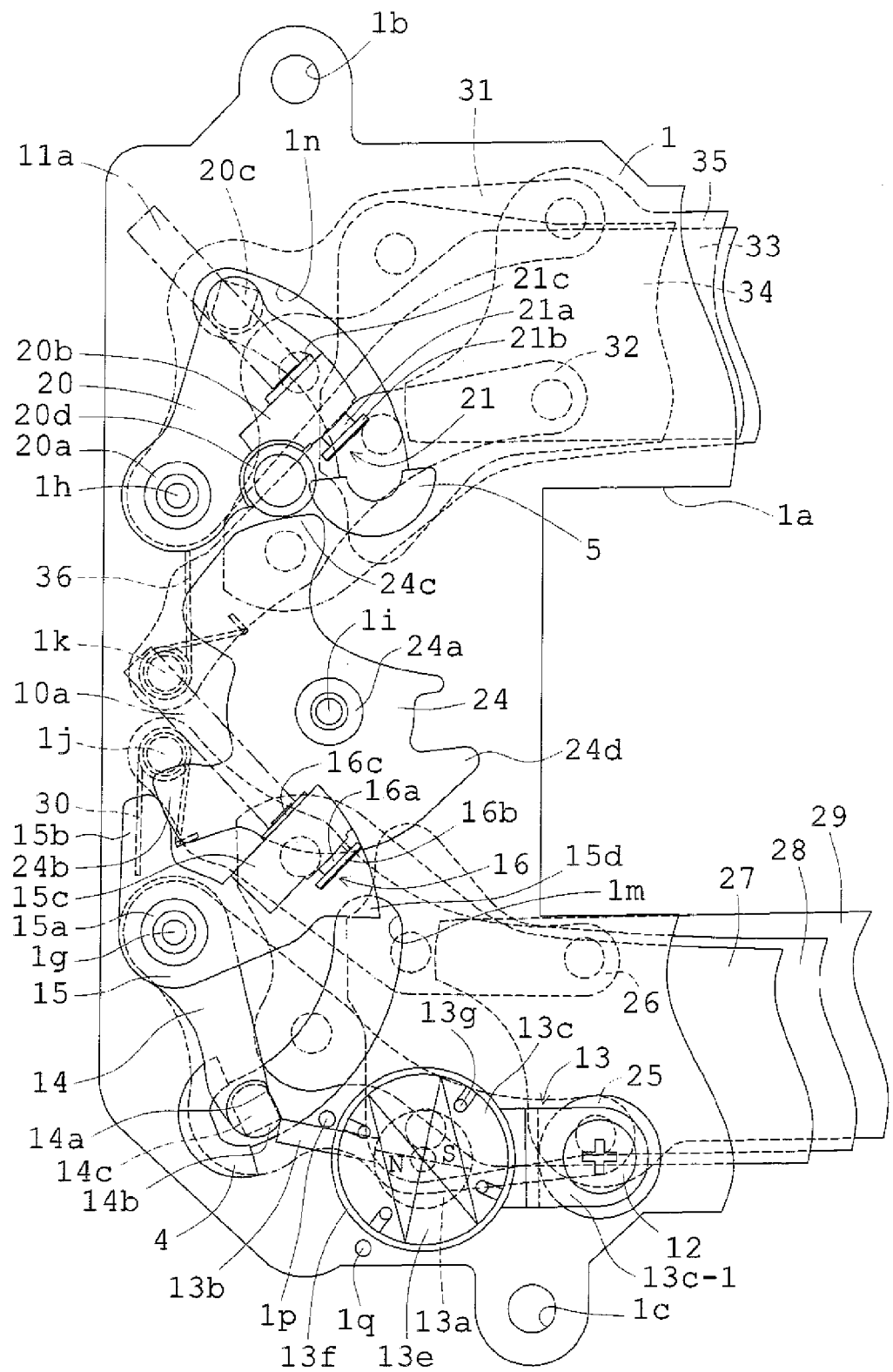
FIG. 10 is a plan view showing the set state of the shutter when the second photography mode or the third photography mode is selected.
Figure 11:
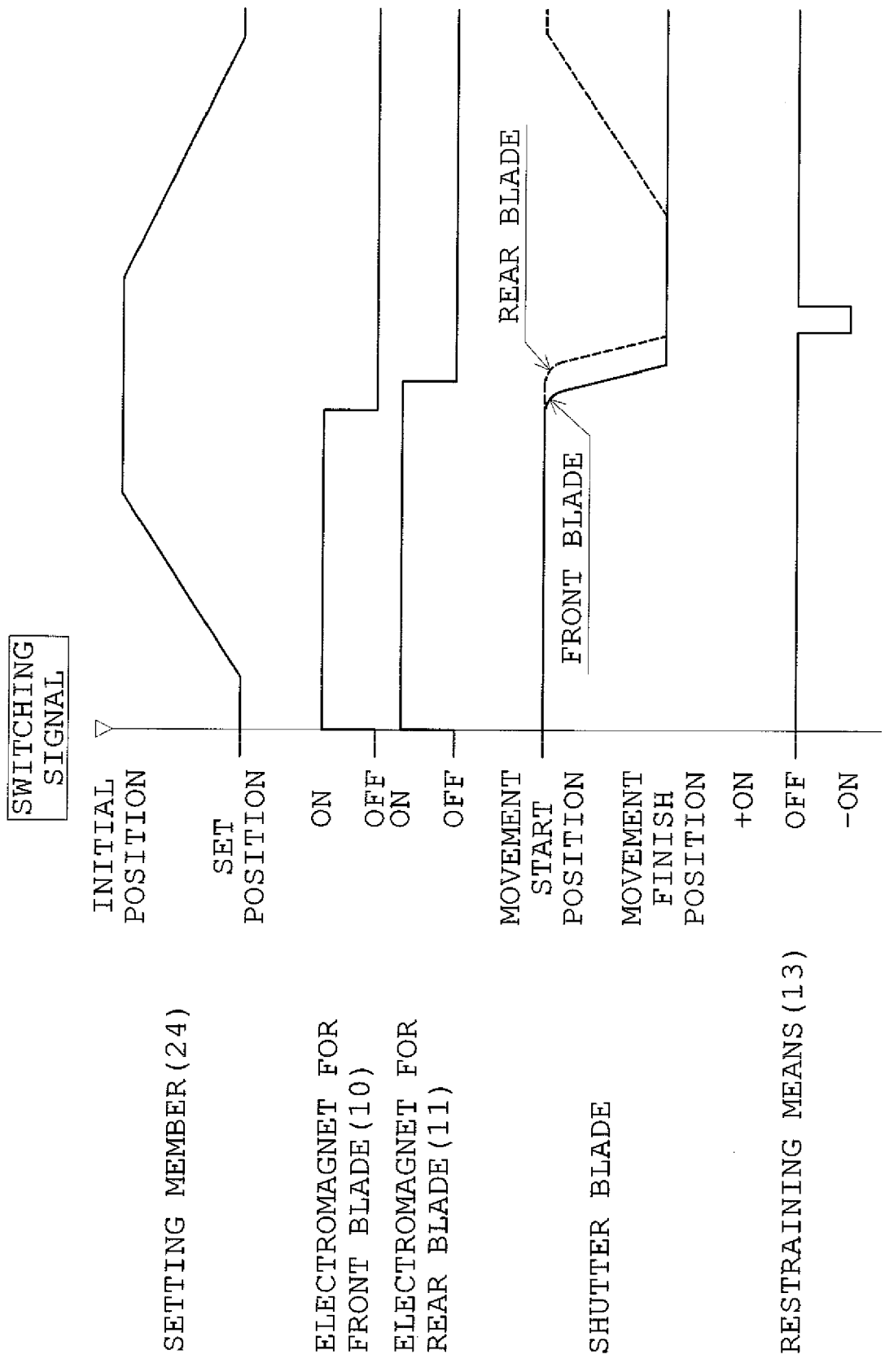
FIG. 11 is a timing chart showing an operational relationship of the main components of the shutter in switching from the first photography mode to the second photography mode or the third photography mode by a first switching method.

First, an operation by a first switching method will be described with reference to FIGS. 4 and 7 and also newly with reference to FIGS. 9 to 11. FIG. 9 is a plan view showing a midway state of a switching operation when the second photography mode or the third photography mode is selected in the selection state of the first photography mode, FIG. 10 is a plan view showing a finish state of the switching operation when the second photography mode or the third photography mode is selected, that is, the set state, and FIG. 11 is a timing chart showing an operational relationship of the main components in the operation by the first switching method from the first photography mode to the second photography mode or the third photography mode.

FIG. 4 shows the set state when the photography in the first photography mode is selected as described above. In this state, when the photographer selects the second photography mode or the third photography mode with the selection means of the camera, the unshown movable mirror is brought into an up state by means as desecrated in, for example, Japanese Patent Laid-Open No. 2001-222059, and the state is maintained. Also, as shown in FIG. 11, by a switching signal at that time, the electromagnets 10 and 11 are energized, and then the setting member 24 is returned to the initial position as in the photography in the first photography mode.

Then, the two electromagnets 10 and 11 are deenergized. In FIG. 11, the timing thereof is shown the same as the timing of the electromagnets 10 and 11 shown in FIG. 8 for convenience. Specifically, the timing is shown of starting to operate the rear blade after the front blade enters the state shown in FIG. 6. However, without any problem in a relationship with a control system of the camera body, a switching operation time is preferably as short as possible. Therefore, the timing of deenerziging the electromagnet 11 may be earlier, and thus may be equal to the timing of deenerziging the electromagnet 10.

As such, the two electromagnets 10 and 11 are deenergized, the driving members 14, 15 and 20 are rotated clockwise, and the front blade and the rear blade finish moving, the state in FIG. 7 is entered as described above. When the rear blade finishes moving, a current in the reverse direction is supplied to the coil 13e of the restraining means 13. Thus, the permanent magnet rotor 13a is rotated clockwise in FIG. 7, and is stopped by the restraining member 13b abutting against the stopper pin 1p. Then, the coil 13e is deenergized, and this state is shown in FIG. 9. In this state, the tip of the restraining member 13b is placed within the operation path of the restrained portion 14b of the first driving member for front blade 14.

When the state in FIG. 9 is obtained, the setting operation is immediately started. In the state in FIG. 9, when the unshown member of the camera body presses the pressed portion 24d, the setting member 24 is rotated clockwise from the initial position against the biasing force of the unshown spring. In this process, the pressing portion 24b of the setting member 24 first presses the pressed portion 15b of the second driving member for front blade 15, and starts to rotate the second driving member for front blade 15 counterclockwise against the biasing force of the front blade driving spring 18. Along therewith, the first driving member for front blade 14 is also rotated counterclockwise by the biasing force of the set spring 30.

However, only the first driving member for front blade 14 is slightly rotated and then the restrained portion 14b abuts against the top surface of the restraining member 13b, and the first driving member for front blade 14 is stopped before the front blade enters the aperture 1a. Thus, thereafter, only the second driving member for front blade 15 is rotated counterclockwise against the biasing force of the front blade driving spring 18. The operation of the front blade at this time is slight and not shown in FIG. 11. This also applies to the timing charts in FIGS. 12 to 14.

As such, when the rotation of the first driving member for front blade 14 is restrained, then the pressing portion 24c of the setting member 24 starts to press the roller 20d of the rear blade driving member 20. Thus, the rear blade driving member 20 is rotated counterclockwise against the biasing force of the rear blade driving spring 22 and starts to move the rear blade upward. Thus, thereafter, only the second driving member for front blade 15 and the rear blade driving member 20 are rotated counterclockwise together. Then, when the three blades 33 to 35 of the rear blade are stacked and retracted upward from the aperture 1a, immediately thereafter, the iron scrap portions 16c and 21c of the iron scrap members 16 and 21 successively abut against the iron core members 10a and 11a of the electromagnets 10 and 11. Slightly after the abutment, the rotation of the setting member 24 is stopped to enter the set state shown in FIG. 10.

Figure 12:
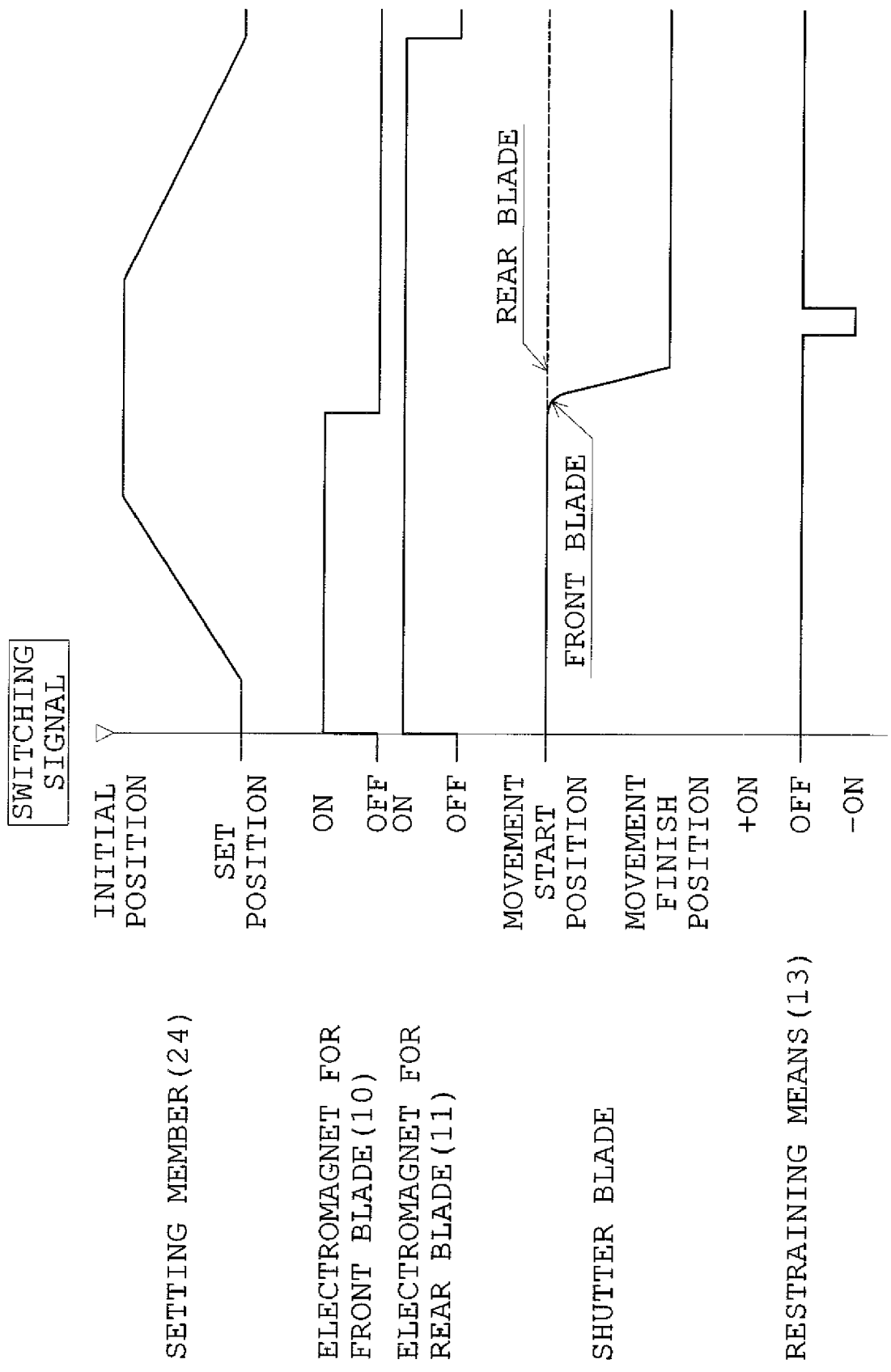
FIG. 12 is a timing chart showing an operational relationship of the main components of the shutter in switching from the first photography mode to the second photography mode or the third photography mode by a second switching method.

Next, an operation by a second switching method will be described with reference to FIGS. 4, 6 and 10 and also newly with reference to FIG. 12. FIG. 12 is a timing chart showing an operational relationship of the main components in the operation by the second switching method from the first photography mode to the second photography mode or the third photography mode.

For the second switching method, in the set state of the first photography mode shown in the FIG. 4, if the photographer selects the second photography mode or the third photography mode with the selection means of the camera, the unshown movable mirror is maintained in the up state, and the electromagnets 10 and 11 are energized by a switching signal and then the setting member 24 is returned to the initial position.

For the first switching method, after this operation, the two electromagnets 10 and 11 are successively deenergized to finish moving the front blade and the rear blade, and then the current in the reverse direction is supplied to the coil 13e of the restraining means 13. On the other hand, for the second switching method, the electromagnet for front blade 10 is deenergized, but the electromagnet for rear blade 11 is not immediately deenergized but is continuously energized. Thus, for this switching method, when a state is entered where the electromagnet for front blade 10 is deenergized and the front blade finishes moving, that is, the state shown in FIG. 6, a current in the reverse direction is supplied to the coil 13e of the restraining means 13. Thus, the permanent magnet rotor 13a is rotated clockwise in FIG. 6, but the restraining member 13b abuts against the stopper pin 1p and is stopped to deenergize the coil 13e.

Then, while the electromagnet for rear blade 11 is energized, the setting member 24 is rotated clockwise according to the first switching method, and the setting operation is performed. In this case, the iron scrap member 21 of the rear blade driving member 20 is sucked by the iron core member 11a of the electromagnet for rear blade 11. Thus, mostly during rotation of the setting member 24 from immediately after the start of the rotation, the pressing portion 24b presses the pressed portion 15b to rotate only the second driving member for front blade 15 counterclockwise against the biasing force of the front blade driving spring 18. Thus, an amount of setting force at this time may be much smaller than an amount of setting force in the first switching method.

Then, in the stage where the iron scrap portion 16c of the iron scrap member 16 abuts against the iron core member 10a of the electromagnet for front blade 10, the pressing portion 24c of the setting member 24 abuts against and presses the roller 20d of the rear blade driving member 20, and thus the rear blade driving member 20 is rotated counterclockwise against the biasing force of the rear blade driving spring 22. Then, when the second driving member for front blade 15 and the rear blade driving member 20 are slightly rotated counterclockwise, the rotation of the setting member 24 is stopped. When the electromagnet for rear blade 11 is deenergized, the set state in FIG. 10 is entered.

Figure 13:
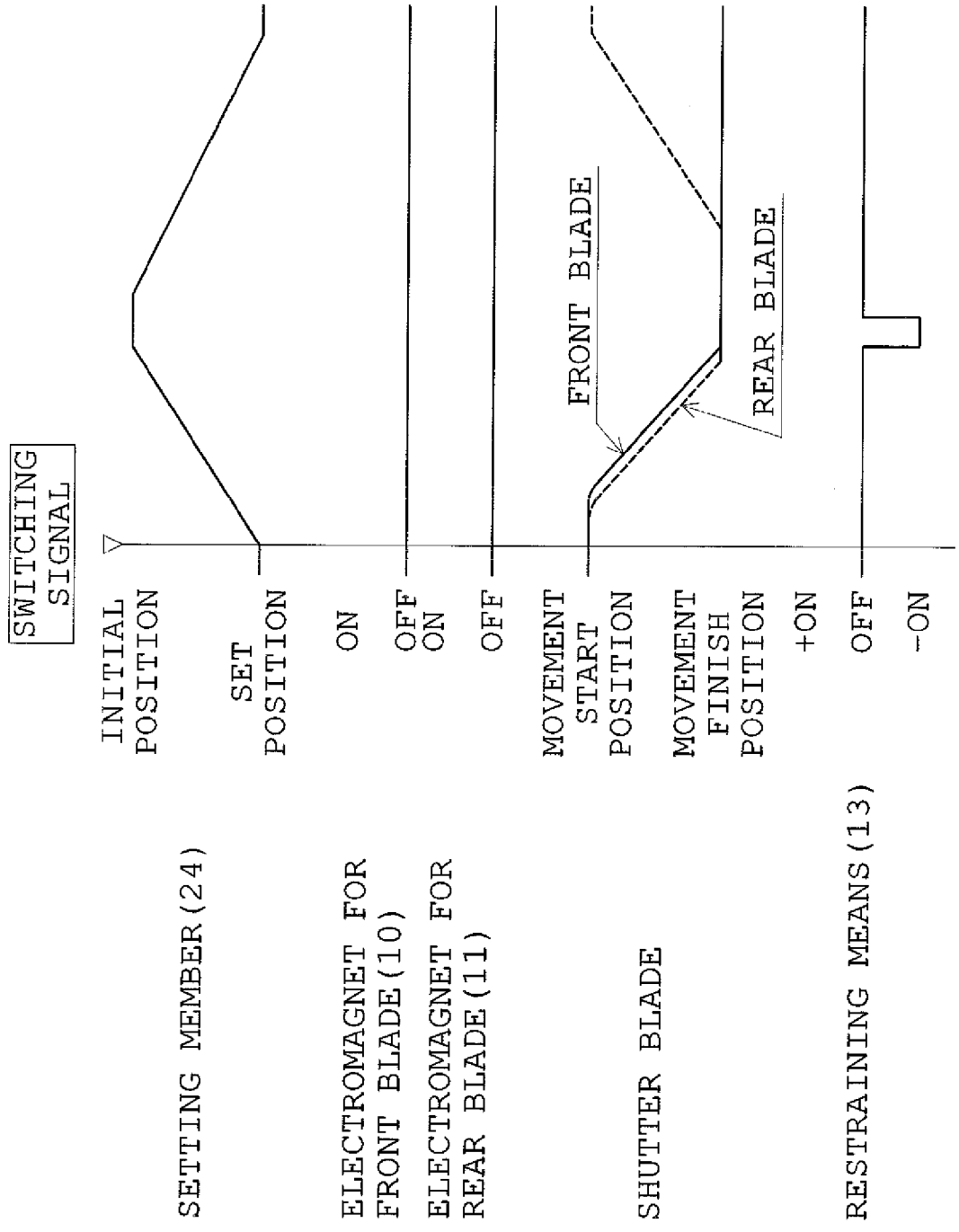
FIG. 13 is a timing chart showing an operational relationship of the main components of the shutter in switching from the first photography mode to the second photography mode or the third photography mode by a third switching method.

Next, an operation by a third switching method will be described with reference to FIGS. 4, 7, 9 and 10 and also newly with reference to FIG. 13. FIG. 13 is a timing chart showing an operational relationship of the main components in the operation by the third switching method from the first photography mode to the second photography mode or the third photography mode.

For the third switching method, in the set state in the first photography mode shown in the FIG. 4, if the photographer selects the second photography mode or the third photography mode with the selection means of the camera, the unshown movable mirror is maintained in the up state. However, as is apparent from FIG. 13, for the third switching method, the electromagnets 10 and 11 are not energized by a switching signal, but the setting member 24 immediately starts to be returned to the initial position.

In the state in FIG. 4, when the setting member 24 starts to be rotated counterclockwise, pressing of the pressing portion 24c against the roller 20d of the rear blade driving member 20 is released, and then pressing of the pressing portion 24c against the pressed portion 15b of the second driving member for front blade 15 is released. Thus, the roller 20d of the rear blade driving member 20 follows the pressing portion 24c of the setting member 24, and the rear blade driving member 20 is rotated clockwise by the biasing force of the rear blade driving spring 22, and the rear blade is relatively slowly moved downward. On the other hand, the pressed portion 15b of the second driving member for front blade 15 follows the pressing portion 24b of the setting member 24, and the second driving member for front blade 15 is rotated clockwise by the biasing force of the front blade driving spring 18, the pressing portion 15d presses the pressed portion 14a to rotate the first driving member for front blade 14 clockwise against the biasing force of the set spring 30, and thus the front blade is also relatively slowly moved downward.

The driving pin 20c of the rear blade driving member 20 first abuts against the shock absorbing member 5 to stop the rear blade driving member 20 and the rear blade, then the driving pin 14c of the first driving member for front blade 14 abuts against the shock absorbing member 4 to stop the first driving member for front blade 14, the second driving member for front blade 15, and the front blade. This state is shown in FIG. 7. When the state in FIG. 7 is thus obtained, a current in the reverse direction is immediately supplied to the coil 13e of the restraining means 13. Thus, the permanent magnet rotor 13a is rotated clockwise in FIG. 7, but the restraining member 13b abuts against the stopper pin 1p and is stopped, and then the coil 13e is deenergized.

Then, the setting operation is immediately performed as the setting operation in the first switching method, and the set state shown in FIG. 10 is obtained. Thus, in the third switching method, the two electromagnets 10 and 11 are not energized at all in the switching operation. This is more advantageous than the above two switching methods in term of power saving. The time required for the switching operation may be shorter than that by the above two switching methods.

Figure 14:
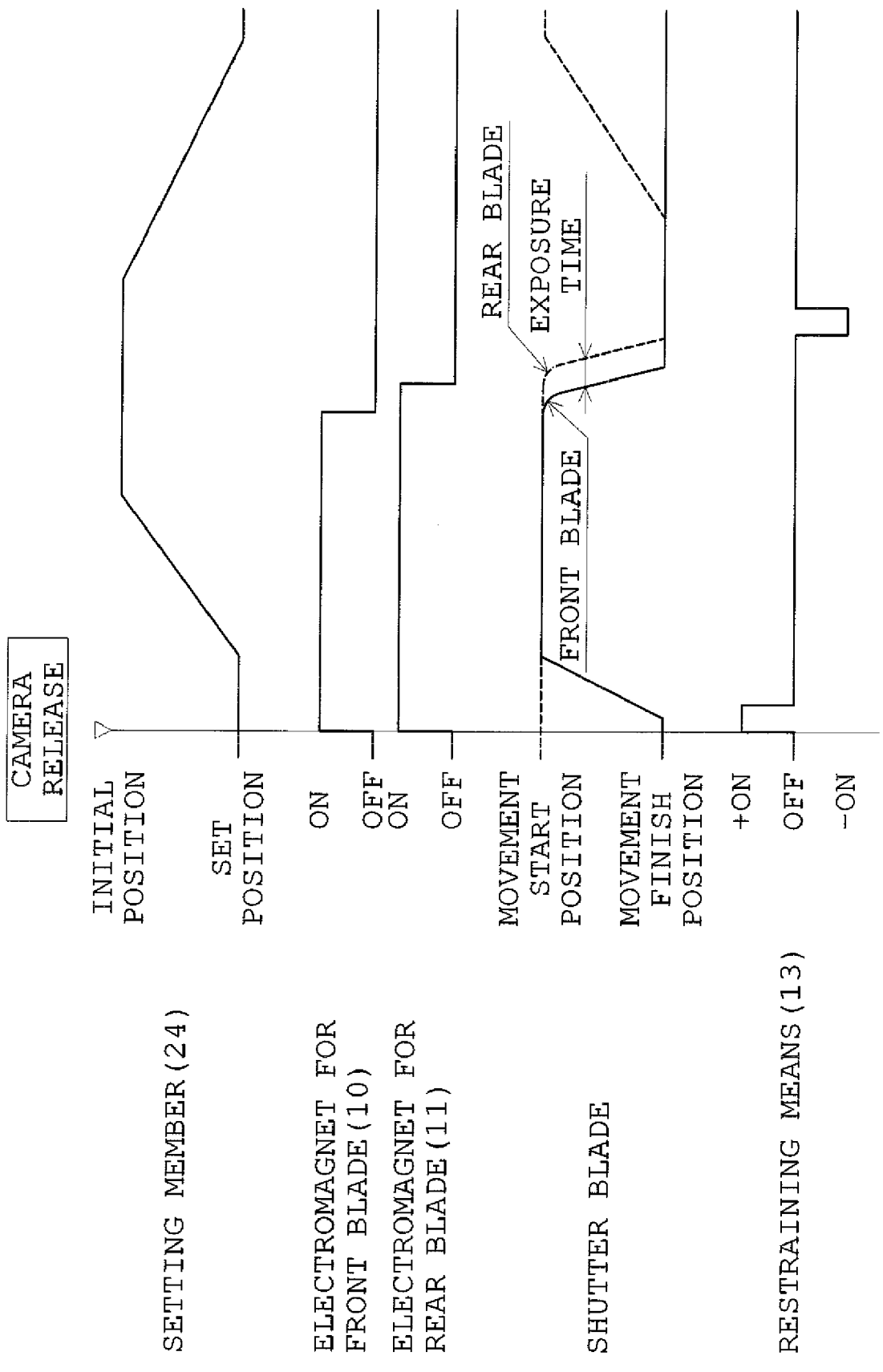
FIG. 14 is a timing chart showing an operational relationship of the main components of the shutter in photography in the second photography mode.

Next, the operation in the second photography mode selected as described above, that is, the operation in the mode in which both the front blade and the rear blade open the exposure aperture in the set state, and in photography, the front blade once closes the exposure aperture in an initial stage after release, and then the front blade starts to open the exposure aperture to start photography exposure and the rear blade finishes closing the exposure aperture to finish the photography exposure for photography using an electronic finder will be described with reference to FIGS. 4 to 7, 9 and 10 and also newly with reference to FIG. 14. FIG. 14 is a timing chart showing an operational relationship of the main components in photography in the second photography mode. For the operation in the second photography mode, the contents that can be sufficiently understood from the above descriptions will be simplified.

FIG. 10 shows a set state when the second photography mode is selected. Thus, as described above, the movable mirror is maintained in the up state. At this time, the coils 10b and 11b of the two electromagnets 10 and 11 and the coil 13e of the restraining means 13 are not energized. However, the permanent magnet rotor 13a of the restraining means 13 is rotated clockwise, and the tip of the restraining member 13b is in contact with the restrained portion 14b of the first driving member for front blade 14 to restrain counterclockwise rotation of the first driving member for front blade 14 by the biasing force of the set spring 30. Thus, unlike the set state in the first photography mode, the aperture 1a is fully opened, and if a power supply switch of the camera is on, the current state of the subject to be photographed can be observed through the electronic finder.

In this set state, when the release button of the camera is pressed while the subject image is observed through the electronic finder, the coils 10b and 11b of the two electromagnets 10 and 11 are energized, and simultaneously a current in the forward direction is supplied to the coil 13e of the restraining means 13. Thus, on the one hand, the iron scrap members 16 and 21 having been simply in contact with the iron core members 10a and 11a of the electromagnets 10 and 11 are sucked and held by electromagnetic forces. On the other hand, the permanent magnet rotor 13a of the restraining means 13 is rotated counterclockwise until the restraining member 13b abuts against the stopper pin 1q, and then the coil 13e is deenergized.

Thus, the permanent magnet rotor 13a is rotated counterclockwise to release the restraint of the first driving member for front blade 14 by the restraining member 13b, the first driving member for front blade 14 is rotated counterclockwise by the biasing force of the set spring 30, and the three blades 27 to 29 of the front blade are moved upward by the driving pin 14c. Thus, the three blades 27 to 29 of the front blade have a decreasing amount of mutual overlapping of adjacent blades, but when the pressed portion 14a of the first driving member for front blade 14 abuts against the pressing portion 15d of the second driving member for front blade 15 to stop the rotation of the first driving member for front blade 14, the three blades 27 to 29 are developed to completely close the aperture 1a. This state is shown in FIG. 4.

When the state shown in FIG. 4 is obtained, the unshown member of the camera body is retracted from the pressed portion 24d of the setting member 24. Thus, along therewith, the setting member 24 starts to be rotated counterclockwise by the biasing force of the unshown spring. In an initial stage of the rotation, the second driving member for front blade 15 and the rear blade driving member 20 are slightly rotated clockwise and then stopped as described above. Then, the setting member 24 is returned to the initial position and stopped. This state is shown in FIG. 5.

When the state shown in FIG. 5 is obtained, as in the photography in the first photography mode, the electromagnet for front blade 10 is deenergized and then the electromagnet for rear blade 11 is deenergized at a time interval corresponding to brightness of the subject. Thus, first, when the electromagnet for front blade 10 is deenergized, the second driving member for front blade 15 is rotated clockwise together with the first driving member for front blade 14, and the three blades 27 to 29 of the front blade open the aperture 1a with an increasing amount of mutual overlapping of adjacent blades. When the brightness of the subject is relatively dark, the driving pin 14c abuts against the shock absorbing member 4 and the rotation of the driving members 14 and 15 is stopped before the rear blade starts moving. This state is shown in FIG. 6, and the three blades 27 to 29 of the front blade are stacked and stored below the aperture 1a.

When the electromagnet for rear blade 11 is deenergized a predetermined time after the electromagnet for front blade 10 is deenergized, the rear blade driving member 20 is rotated clockwise, and thus the three blades 33 to 35 of the rear blade close the aperture 1a with a decreasing amount of mutual overlapping of adjacent blades. When the three blades 33 to 35 of the rear blade are developed to completely finish closing the aperture 1a, the driving pin 20c abuts against the shock absorbing member 5 to stop the rotation of the rear blade driving member 20. FIG. 7 shows this state.

When the state in FIG. 7 is thus entered, the photographed imaging information is transmitted from the image pickup device via the information processing circuit and stored in the storage device. On the other hand, a current in the reverse direction is supplied to the coil 13e of the restraining means 13. Thus, the permanent magnet rotor 13a is rotated clockwise in FIG. 7, but when the restraining member 13b abuts against the stopper pin 1p and is stopped, the coil 13e is deenergized. FIG. 9 shows this state. When this state is obtained, the setting operation is immediately performed, but the operation is completely the same as the setting operation in the first and third switching methods, and the descriptions thereof will be omitted.

In the descriptions so far, the second photography mode is the mode in which both the front blade and the rear blade open the exposure aperture in the set state, and in photography, the front blade once closes the exposure aperture in the initial stage after release, and then the front blade starts to open the exposure aperture to start photography exposure and the rear blade finishes closing the exposure aperture to finish the photography exposure for photography using the electronic finder.

However, the focal plane shutter for digital cameras of the present invention can perform photography using an optical finder by the same operation as in the second photography mode. In this case, even if the aperture 1a is fully opened in the set state, the movable mirror is in a down state, and a subject image just can be observed through the optical finder but cannot be observed through the electronic finder. When the focal plane shutter for digital cameras of the present invention is adopted in a single-lens reflex camera including a half mirror instead of the movable mirror, the photographer can perform photography using the optical finder and the electronic finder depending on cases. This also applies to the third photography mode described below.

Figure 15:
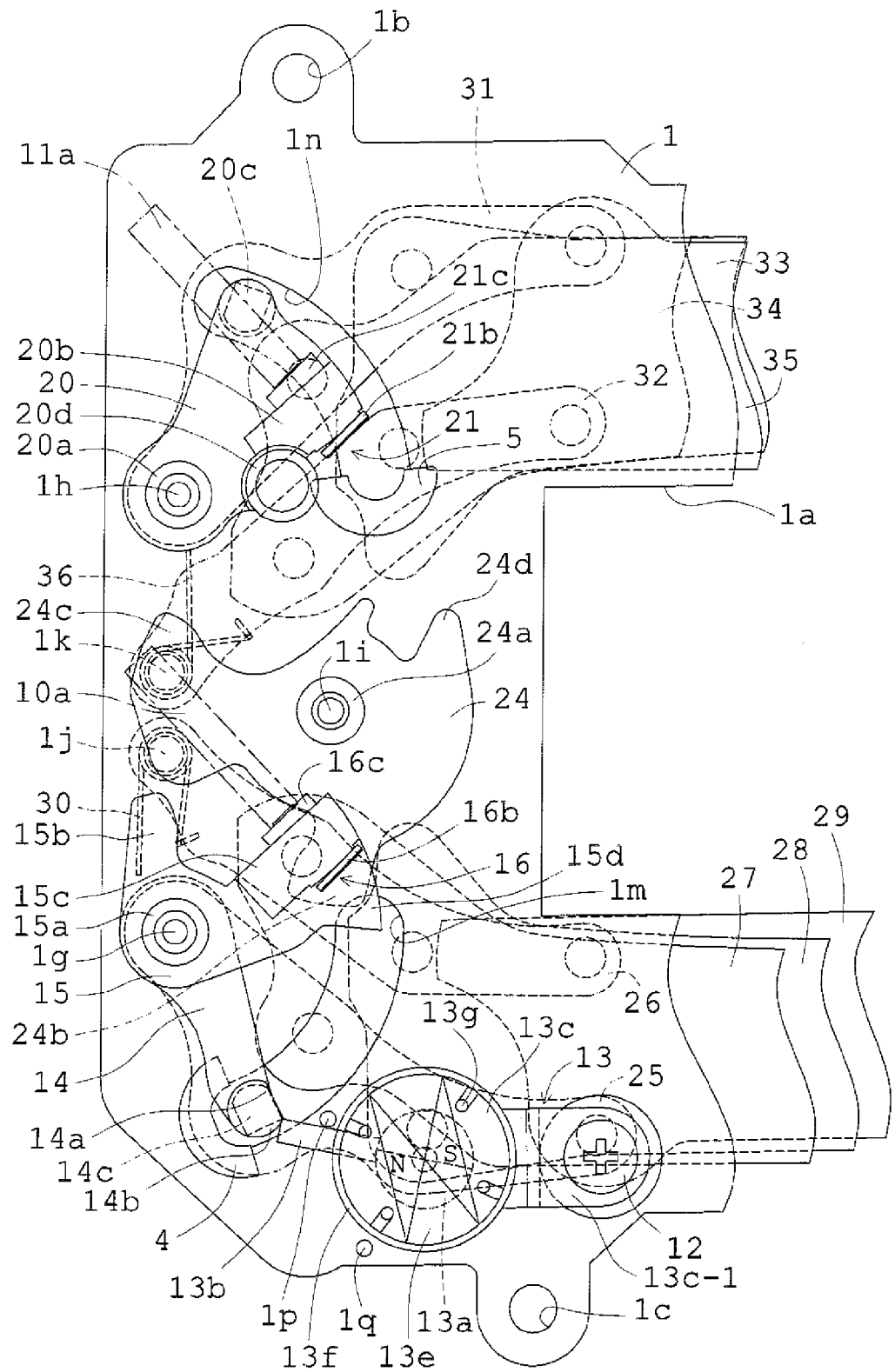
FIG. 15 is a plan view showing a state of the shutter immediately after the release button of the camera is pressed when the third photography mode is selected.
Figure 16:
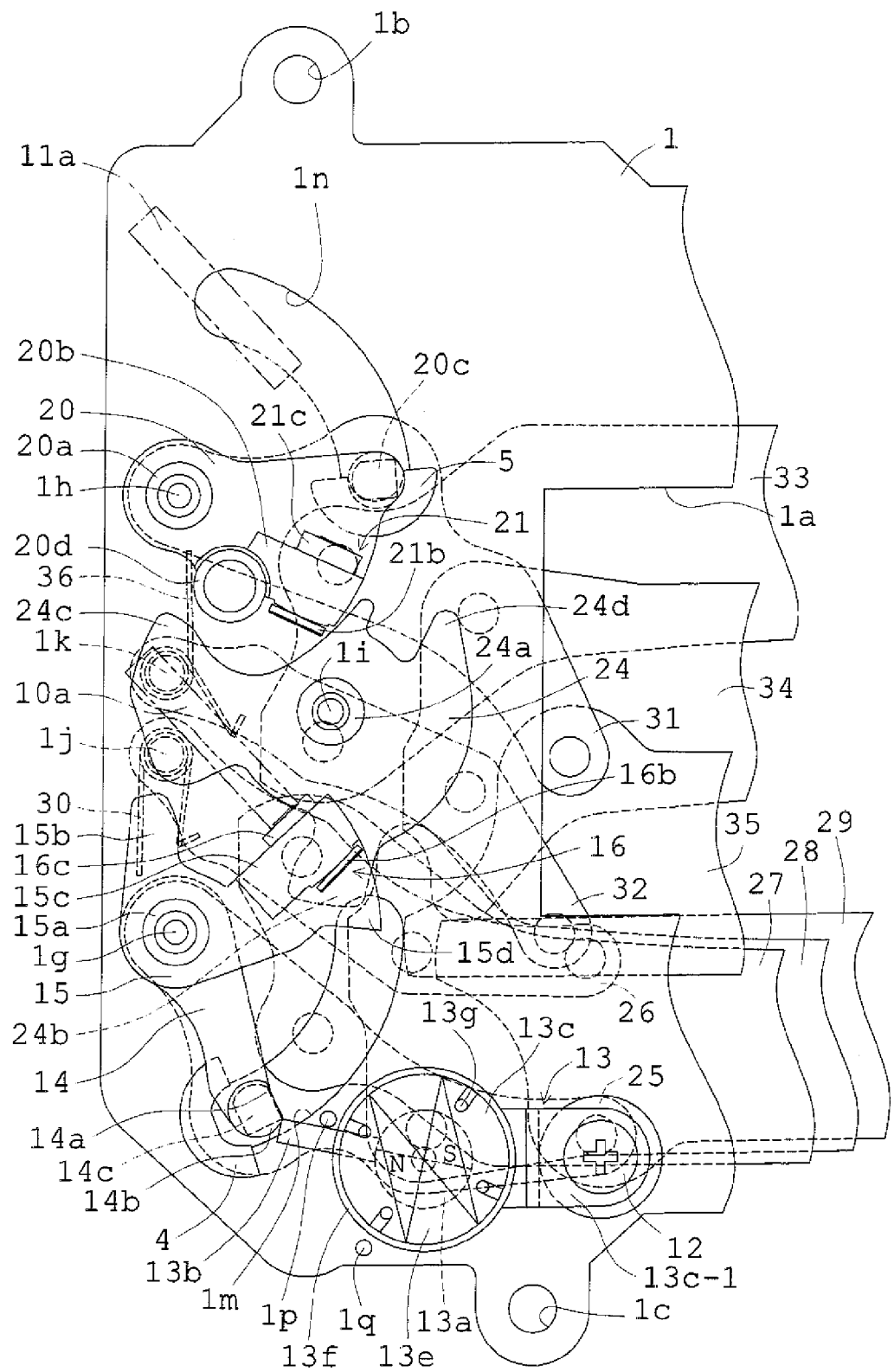
FIG. 16 is a plan view showing a state of the shutter where the rear blade starts to be moved and closes the exposure aperture from the state in FIG. 15 when the third photography mode is selected.
Figure 17:
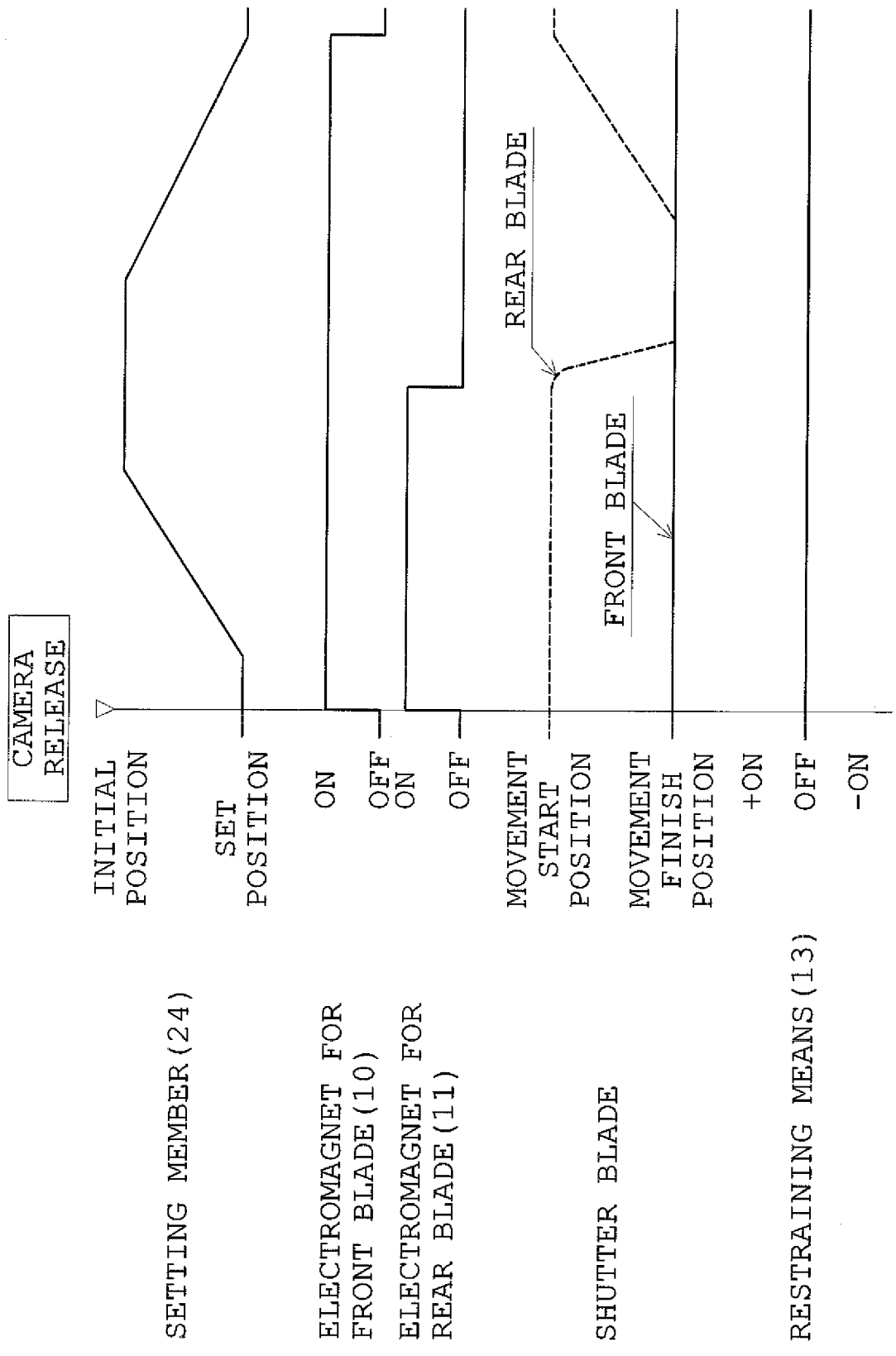
FIG. 17 is a timing chart showing an operational relationship of the main components of the shutter in photography in the third photography mode.

Next, an operation in the third photography mode, that is, an operation in a mode in which both the front blade and the rear blade open the exposure aperture in the set state, and in photography, the electronic control circuit controls the image pickup device to start the photography exposure and the rear blade closes the exposure aperture to finish the photography exposure for photography using the electronic finder will be described with reference to FIG. 10 and also newly with reference to FIGS. 15 to 17. FIG. 15 is a plan view showing a state immediately after the release button of the camera is pressed, FIG. 16 is a plan view showing a state where the rear blade closes the exposure aperture from the state in FIG. 15, and FIG. 17 is a timing chart showing an operational relationship of the main components in photography in the third photography mode. Also for the operation in the second photography mode, the contents that can be sufficiently understood from the above descriptions will be simplified.

As already described, FIG. 10 shows the set state when the second photography mode is selected, and also shows the set state when the third photography mode is selected. Thus, when the photographer switches from a selection state of the third photography mode to a selection state of the second photography mode, or from the selection state of the second photography mode to the selection state of the third photography mode, the components of this embodiment are not operated at all. Thus, when the third photography mode is selected, an operation sequence for each photography described below is simply changed.

In the set state in FIG. 10, as described above, the movable mirror is maintained in the up state, and the coils 10b and 11b of the two electromagnets 10 and 11 and the coil 13e of the restraining means 13 are not energized. However, the permanent magnet rotor 13a of the restraining means 13 is rotated clockwise, and the tip of the restraining member 13b is in contact with the restrained portion 14b of the first driving member for front blade 14 to restrain counterclockwise rotation of the first driving member for front blade 14 by the biasing force of the set spring 30. Thus, if the aperture 1a is fully opened and a power supply switch of the camera is on, the state of the subject to be photographed can be observed through the electronic finder. In the third photography mode, the coil 13e of the restraining means 13 is not energized at all thereafter. Thus, the restraining member 13b maintains this state.

In this set state, when the release button of the camera is pressed while the subject image is observed through the electronic finder, the coils 10b and 11b of the two electromagnets 10 and 11 are energized, and the iron scrap members 16 and 21 having been simply in contact with the iron core members 10a and 11a of the electromagnets 10 and 11 are sucked and held by electromagnetic forces. Then, when the unshown member of the camera body is retracted from the pressed portion 24d of the setting member 24, along therewith, the setting member 24 starts to be rotated counterclockwise by the biasing force of the unshown spring. In an initial stage of the rotation, the second driving member for front blade 15 and the rear blade driving member 20 are slightly rotated clockwise and then stopped as already described. Then, the setting member 24 is returned to the initial position and stopped. This state is shown in FIG. 15.

When the state shown in FIG. 15 is obtained, the electronic control circuit controls the image pickup device to start photography. When a predetermined time determined correspondingly to the brightness of the subject passes, the electromagnet for front blade 10 is still energized, and the electromagnet for rear blade 11 is deenergized. Thus, the rear blade driving member 20 is rotated clockwise, and the three blades 33 to 35 of the rear blade close the aperture 1a with a decreasing amount of mutual overlapping of adjacent blades. When the three blades 33 to 35 of the rear blade are developed to completely finish the aperture 1a, the rear blade driving member 20 is stopped by the driving pin 20c abutting against the shock absorbing member 5. FIG. 16 shows this state. Even in this state, the electromagnet for front blade 10 is energized, and the iron scrap member 21 of the second driving member for front blade 15 is still sucked by the electromagnet for front blade 10.

In the state in FIG. 16, when the photographed imaging information is stored in the storage device via the information processing circuit, the setting operation is immediately performed. In the state in FIG. 16, when the pressed portion 24d of the setting member 24 is pressed by the unshown member of the camera body, the setting member 24 is rotated clockwise from the initial position against the biasing force of the unshown spring. However, at this time, the iron scrap member 21 of the second driving member for front blade 15 is sucked by the electromagnet for front blade 10. Thus, the pressing portion 24c of the setting member 24 first presses the roller 20d to rotate the rear blade driving member 20 counterclockwise against the biasing force of the rear blade driving spring 22. Thus, the three blades 33 to 35 of the rear blade are moved upward with an increasing amount of mutual overlapping of adjacent blades.

When the three blades 33 to 35 of the rear blade are stacked and retracted upward from the aperture 1a, and the iron scrap portion 21c of the iron scrap member 21 abuts against the iron core member 11a of the electromagnet for rear blade 11, the pressing portion 24b of the setting member 24 abuts against the pressed portion 15b of the second driving member for front blade 15, and presses the second driving member for front blade 15. Then, the setting member 24 slightly overcharges the front blade driving spring 18 and the rear blade driving spring 22 and is then stopped. Then, the electromagnet for front blade 10 is deenergized, thereby returning to the set state shown in FIG. 10.

In the above description on operation, when the release button of the camera is pressed in the set state in FIG. 10, both the electromagnet for front blade 10 and the electromagnet for rear blade 11 are energized, and the electromagnet for front blade 10 is deenergized in a finish stage of the setting operation. Thus, in this case, in most of the process of the setting operation, the pressing portion 24b of the setting member 24 does not press the pressed portion 15b of the second driving member for front blade 15 against the biasing force of the front blade driving spring 18. This is advantageous in terms of an amount of setting force.

However, instead of such operation, an operation can be performed without the electromagnet for front blade 10 being energized at all. Specifically, in this case, when the release button of the camera is pressed in the set state in FIG. 10, only the electromagnet for rear blade 11 is energized and then the setting member 24 is rotated counterclockwise. Then, the pressed portion 15b of the second driving member for front blade 15 follows the pressing portion 24b of the setting member 24, and the second driving member for front blade 15 is rotated clockwise by the biasing force of the front blade driving spring 18. When the setting member 24 is returned to the initial position, the pressing portion 15d presses the pressed portion 14a of the first driving member for front blade 14 and the second driving member for front blade 15 is stopped.

Thus, when the rear blade driving member 20 is then rotated clockwise and the photography is finished, the state in FIG. 9 is entered, and the restrained portion 14b of the first driving member for front blade 14 is moved away from the restraining member 13b of the restraining means 13. Thus, the setting operation in this case is performed in the same manner as the setting operation in the first switching method. If the operation in the third photography mode is thus performed, the shutter unit is advantageous in terms of power saving.

A fourth photography mode will be described. As already described, the fourth photography mode is the mode in which both the front blade and the rear blade open the exposure aperture in the set state, and in photography, the front blade is not operated, but the electronic control circuit controls the image pickup device to both start and finish the photography exposure and the rear blade is operated to close the exposure aperture after finish of the photography exposure for photography using the electronic finder. Thus, the fourth photography mode is different from the third photography mode simply in that the rear blade closes the exposure aperture after the finish of the photography exposure, while the rear blade closes the exposure aperture to finish the photography exposure in the third photography mode.

Thus, the modes are different only in timing of starting the closing operation of the rear blade, and the set state and the state immediately after the imaging information is stored in the storage device are completely the same. Thus, the description on operation in the fourth photography mode will be omitted. When the fourth photography mode can be selected in addition to the three photography modes described above as specifications of the camera, switching from the first photography mode to the fourth photography mode is performed in the same manner as the switching from the first photography mode to the second photography mode or the third photography mode, and switching from the second photography mode or the third photography mode to the fourth photography mode and switching from the fourth photography mode to the second photography mode or the third photography mode are merely changes of an operation sequence, and the shown components in the embodiment are not operated at all.

Next, a switching operation when the photographer selects the first photography mode in the state where the second photography mode or the third photography mode is selected will be described with reference to FIGS. 4 and 10 and also newly with reference to FIG. 18. FIG. 18 is a timing chart showing an operational relationship of the main components in the operation from the second photography mode or the third photography mode to the first photography mode. When the fourth photography mode can be selected as described above, the switching operation also applies in switching from the fourth photography mode to the first photography mode.

As described above, both when the second photography mode is selected and when the third photography mode is selected, the set state is as shown in FIG. 10. Thus, the switching operation from the second photography mode to the first photography mode and the switching operation from the third photography mode to the first photography mode are completely the same. Then, when the photographer selects the first photography mode with the selection means of the camera, the unshown movable mirror is brought into the down state, and up and down operations can be performed for each photography, and by a switching signal at that time, a current in the forward direction is supplied to the coil 13e of the restraining means 13 in the state in FIG. 10. Thus, the permanent magnet rotor 13a is rotated counterclockwise and stopped by the restraining member 13b abutting against the stopper pin 1q. Then, the coil 13e is deenergized.

As such, when the permanent magnet rotor 13a is rotated counterclockwise, the tip of the restraining member 13b is released from the restrained portion 14b of the first driving member for front blade 14. Thus, the first driving member for front blade 14 is rotated counterclockwise by the biasing force of the set spring 30, the three blades 27 to 29 of the front blade are moved upward with a decreasing amount of mutual overlapping of adjacent blades to close the aperture 1a. When the three blades 27 to 29 of the front blade completely close the aperture 1a, immediately thereafter, the pressed portion 14a of the first driving member for front blade 14 abuts against the pressing portion 15d of the second driving member for front blade 15 and is stopped. FIG. 4 shows this state, which is the set state in photography in the first photography mode.

In the above-described embodiment, the restraining means 13 is configured as an electromagnetic device unit in which the restraining member 13b is integrated with the permanent magnet rotor 13a as a movable element reciprocatingly rotated, but the restraining means of the present invention is not limited to such an electromagnetic device unit. For example, an electromagnetic device unit such as an electromagnetic plunger including a rod-like movable element may be used in which the movable element is linearly reciprocated and one end of the movable element goes into and out of an operation path of a pressed portion of a first driving member for front blade. In this case, the movable element is the restraining member in the present invention.

The restraining means in the present invention may be configured so that a restraining member that can go into and out of an operation path of a pressed portion of a first driving member for front blade may be integrated with a rotor or an output shaft of a well known stepping motor. Further, the restraining means in the present invention may include various electromagnetic actuators such as the well-known current control motor or a well-known stepping motor, and a member reciprocatingly rotated or linearly reciprocated by the actuators. Such a configuration is disadvantageous in terms of costs, but may increase flexibility in a layout on the shutter base plate.

In the embodiment, the set spring 30 is fitted to the shaft 1j of the shutter base plate 1, and has one end placed on an unshown spring placing portion of the shutter base plate 1, and the other end placed on the arm 26 of the front blade. The present invention is not limited to such a configuration, but it may be conceivable that the set spring 30 is fitted to the shaft 1g of the shutter base plate 1, has one end placed on the first driving member for front blade 14 and the other end placed on the second driving member for front blade 15, and is thus biased so that the first driving member for front blade 14 is rotated counterclockwise with respect to the second driving member for front blade 15, and biased so that the second driving member for front blade 15 is rotated clockwise with respect to the first driving member for front blade 14. With such a configuration, when the second driving member for front blade 15 is rotated clockwise by the biasing force of the front blade driving spring 18, the second driving member for front blade 15 needs not be rotated against the biasing force of the set spring.

What is claimed is:

1. A focal plane shutter for digital cameras comprising:
   a first driving member for front blade that connects a front blade, has a pressed portion and a restrained portion, and is rotatably mounted to a first shaft of a shutter base plate;
   a second driving member for front blade that has a pressing portion, is rotatably mounted to the first shaft, is rotated by biasing a front blade driving spring in photography, and causes a front blade to open an exposure aperture when the pressing portion presses the pressed portion in rotation of the second driving member and rotates the first driving member for front blade together;
   a set spring that directly or indirectly biases the first driving member for front blade so as to be rotated to a position where the front blade covers the exposure aperture in a set state;
   a rear blade driving member that connects a rear blade, is rotatably mounted to a second shaft of the shutter base plate, and is rotated by a biasing force of a rear blade driving spring in photography, and causes the rear blade to close the exposure aperture;
   a setting member that is rotatably mounted to a third shaft of the shutter base plate, is rotated from an initial position to rotate the second driving member for front blade and the rear blade driving member against the biasing force of each driving spring in an setting operation, maintains the driving members in the set state in a set position, and returns the driving members to the initial position after release of a camera and before start of photography exposure; and
   restraining means that has a restraining member that can go in and out of an operation path of the restrained portion, is mounted to the shutter base plate, can operate the restraining member in the operation path of the restrained portion immediately after finish of photography and before start of the setting operation of the setting member when the restraining member is outside the operation path of the restrained portion, and can operate the restraining member out of the operation path of the restrained portion in a restraining state of the restrained portion when the restraining member is within the operation path of the restrained portion.

2. The focal plane shutter for digital cameras according to claim 1, wherein the restraining means is an electromagnetic device, and the restraining member is a reciprocatable movable element of the electromagnetic device.

3. The focal plane shutter for digital cameras according to claim 1, wherein the restraining means includes an electromagnetic actuator, and a member reciprocated by the electromagnetic actuator, and the member is the restraining member.

4. The focal plane shutter for digital cameras according to claim 1, wherein the restraining means is an electromagnetic device, and the restraining member is a member integrated with a movable element of the electromagnetic device.

5. The focal plane shutter for digital cameras according to claim 4, wherein the movable element is a rotor.

6. The focal plane shutter for digital cameras according to claim 5, wherein the rotor is a permanent magnet rotor that is reciprocatingly rotated within a predetermined angle range in a direction corresponding to an energization direction to a stator coil of the electromagnetic device, and the restraining member is formed to extend in a radial direction of the permanent magnet rotor, and has a tip that is a restraining portion for the restrained member.

7. The focal plane shutter for digital cameras according to claim 6, wherein a magnetic member is mounted to a stator of the electromagnetic device, and when the stator coil is deenergized, the permanent magnet rotor is maintained in a stop state by a magnetic force applied between the permanent magnet rotor and the magnetic member in either of opposite end positions of the rotation angle range.

* * * * *